(12) United States Patent
Yoshimura et al.

(10) Patent No.: US 12,495,398 B2
(45) Date of Patent: Dec. 9, 2025

(54) COMMUNICATIONS NETWORK AND METHODS WITH ENHANCED DUPLEX

(71) Applicant: SHARP Kabushiki Kaisha, Sakai (JP)

(72) Inventors: Tomoki Yoshimura, Camas, WA (US); Zhanping Yin, Vancouver, WA (US); Kenneth James Park, Cathlamet, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 419 days.

(21) Appl. No.: 18/148,121

(22) Filed: Dec. 29, 2022

(65) Prior Publication Data
US 2024/0224240 A1    Jul. 4, 2024

(51) Int. Cl.
*H04W 72/044* (2023.01)
*H04W 72/232* (2023.01)
*H04L 5/14* (2006.01)

(52) U.S. Cl.
CPC ....... *H04W 72/044* (2013.01); *H04W 72/232* (2023.01); *H04L 5/14* (2013.01)

(58) Field of Classification Search
CPC ... H04L 5/14; H04L 5/003; H04L 5/18; H04L 5/26; H04L 5/22; H04L 27/2602; H04L 5/0053; H04W 72/044; H04W 72/232; H04W 72/0446; H04W 72/0453
USPC .......................................................... 370/330
See application file for complete search history.

(56) References Cited

U.S. PATENT DOCUMENTS

| 2022/0369117 A1* | 11/2022 | Sun ........................ H04W 76/27 |
| 2023/0328725 A1* | 10/2023 | Xu ......................... H04L 1/1854 |
| | | 370/329 |
| 2025/0038923 A1* | 1/2025 | Ma ........................ H04L 5/0007 |

OTHER PUBLICATIONS

R1-2211005—3GPP TSG RAN WG1 #111, Toulouse, France, Nov. 14-18, 2022, Source: vivo, Title: Discussion on subband non-overlapping full duplex, 13 pp.

* cited by examiner

*Primary Examiner* — Rownak Islam
(74) *Attorney, Agent, or Firm* — NIXON & VANDERHYE P.C.

(57) ABSTRACT

A wireless terminal communicates across a radio interface with a radio access network. The wireless terminal comprises receiver circuitry and processor circuitry. The receiver circuitry is configured to receive from the radio access network (1) slot format information comprising transmission direction configuration for each symbol in a slot for an uplink (UL) subband; and (2) validation information. The processor circuitry is configured to use the validation information to perform validation or invalidation of the transmission direction configuration for at least a portion of the UL subband.

17 Claims, 15 Drawing Sheets

Bit space

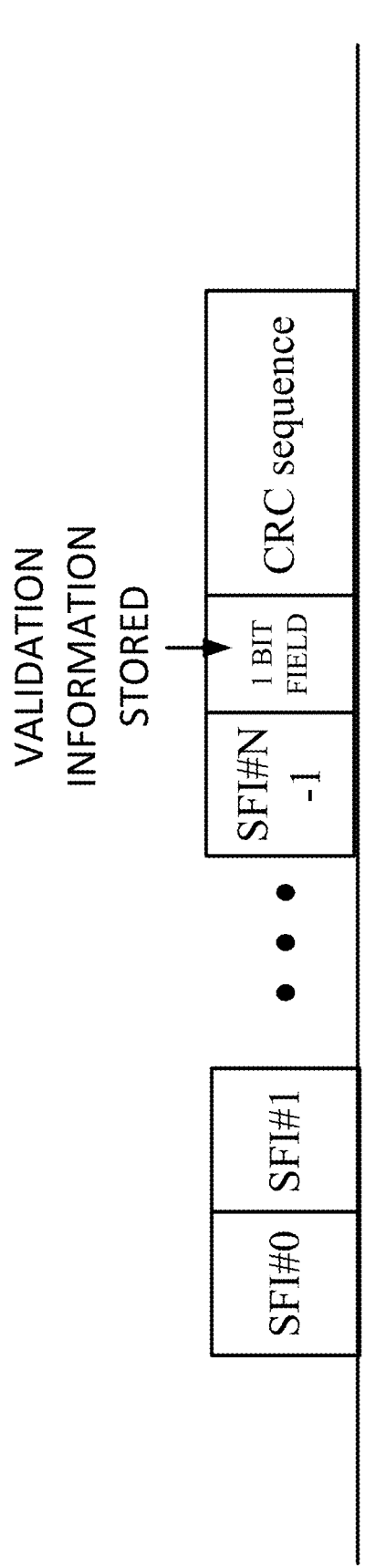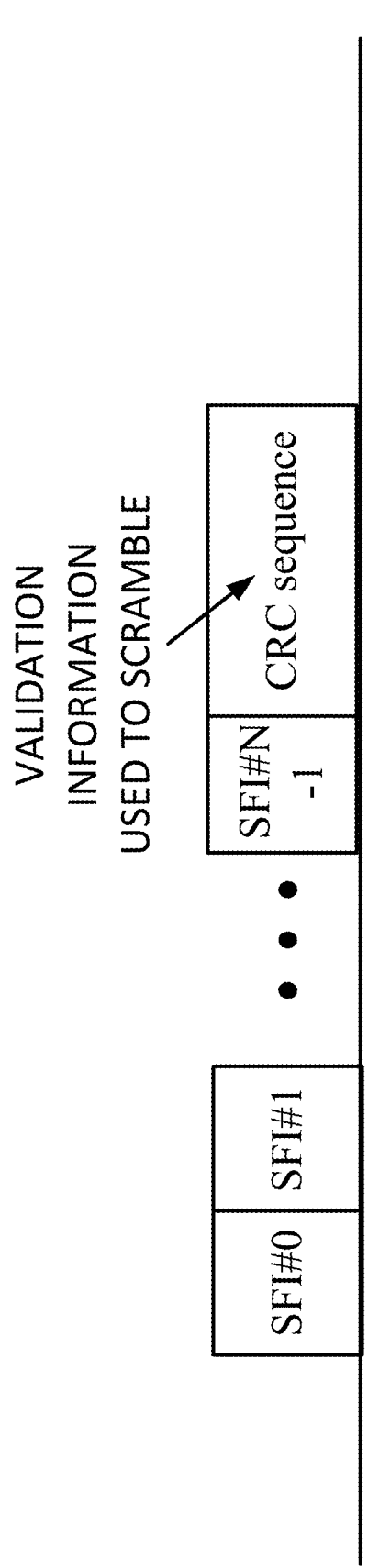

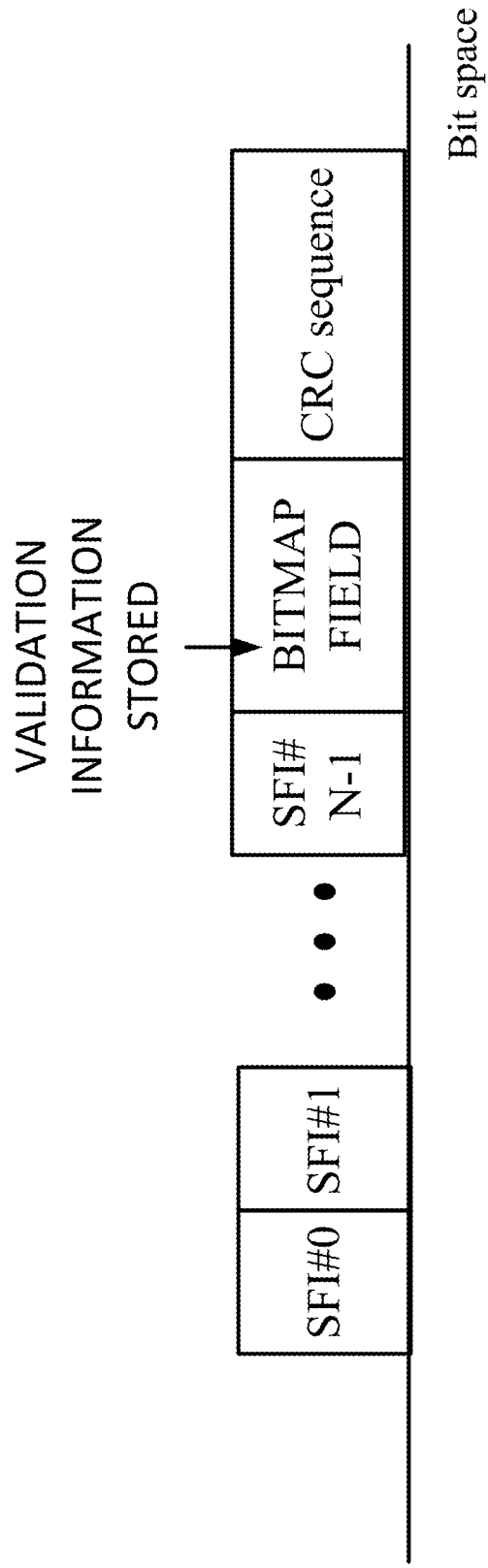

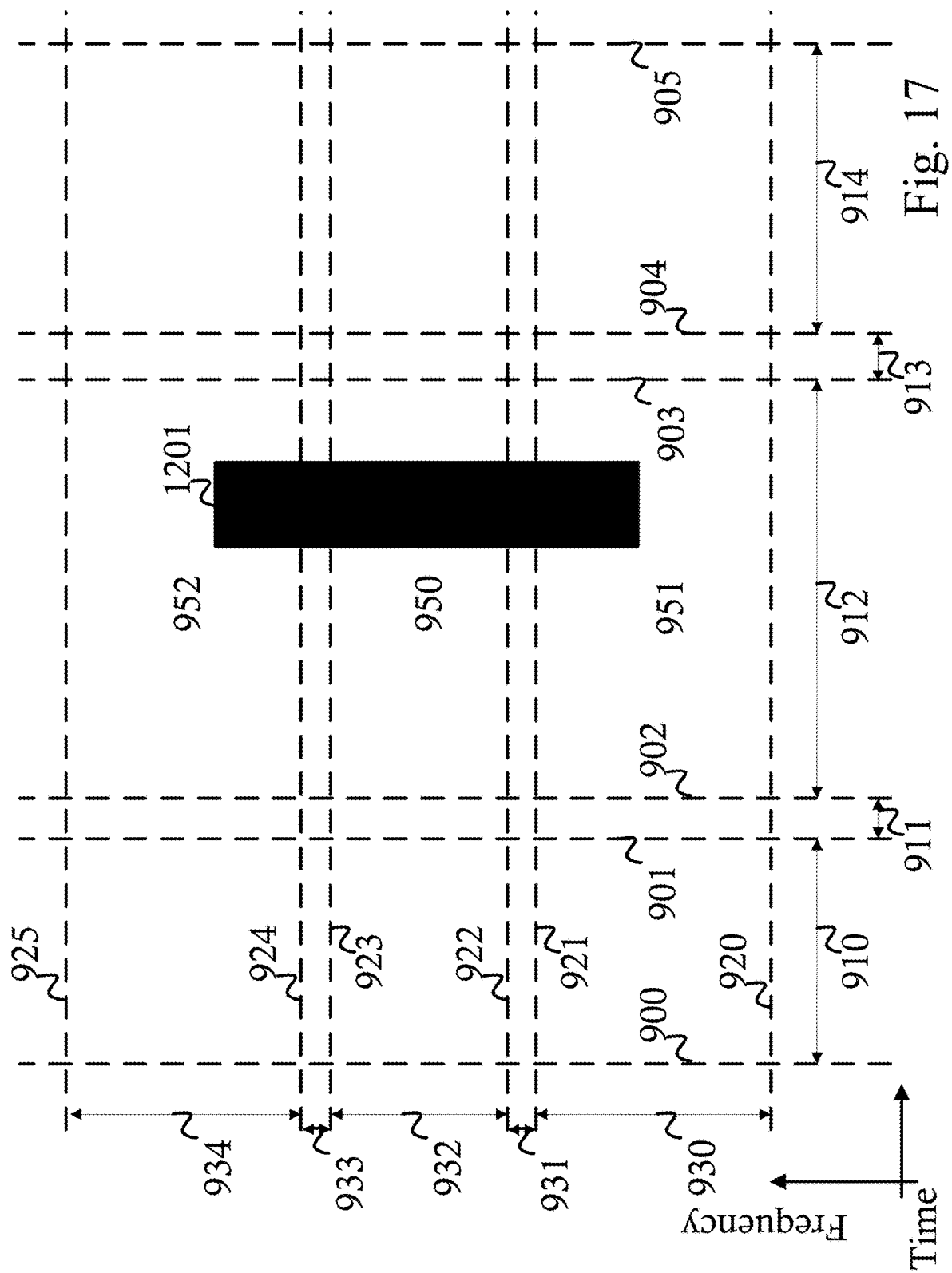

COMMUNICATIONS NETWORK AND METHODS WITH ENHANCED DUPLEX

TECHNICAL FIELD

The technology relates to wireless communications, and particularly to wireless terminals and operations thereof including duplexed operations thereof.

BACKGROUND

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth-generation system, e.g., the 5G System, also called "NR" or "New Radio", as well as "NG" or "Next Generation", is shown in FIG. 1, and is also described in 3GPP TS 38.300. The 5G NR network is comprised of NG RAN, Next Generation Radio Access Network, and 5GC, 5G Core Network. As shown, NG RAN is comprised of gNBs, e.g., 5G Base stations, and ng-eNBs, i.e., LTE base stations. An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations, i.e., gNB & ng-eNB. A gNB node provides NR user plane and control plane protocol terminations towards the UE and is connected via the NG interface to the 5GC. The 5G NR, New Radio, gNB is connected to Access and Mobility Management Function, AMF, and User Plane Function, UPF, in the 5G Core Network, 5GC.

Wireless transmissions from a base station in a direction toward a wireless terminal is referred to as being on the "downlink", DL, transmissions from the wireless terminal in a direction toward the base station is referred to as being on the "uplink", UL. As described in more detail herein, the transmissions may occur in a frame or sub-frame structure which may be conceptualized as a two-dimensional grid. The grid may be structured to have time slots in a first dimension and frequencies or sub-carriers in a second dimension. Time division duplex, TDD, operation occurs when information of the frame or sub-frame is split on a time basis between uplink and downlink. In TDD operation there may be a mapping or assignment, referred to as a TDD pattern, of time slots to uplink and downlink transmissions. Frequency division duplex, FDD, operation occurs when information of the frame or sub-frame is split on a frequency or sub-carrier basis between uplink and downlink.

In dynamic TDD operation, a TDD pattern is configured with flexible regions as shown in FIG. 2. The base station can convert the flexible region to DL region or UL region afterward. Specifically, the base station can indicate usage of the flexible region to the wireless terminal via DCI formats. For example, the base station may indicate usage of the flexible region as downlink by sending a downlink DCI format used to schedule downlink reception on the flexible region. For example, the base station may indicate usage of the flexible region as uplink by sending an uplink DCI format used to schedule uplink transmission on the flexible region.

On the other hand, the base station may indicate usage of the flexible region as downlink, flexible, or uplink via DCI format, a.k.a. DCI format 2_0, not used to schedule downlink reception or uplink transmission. This information is helpful for semi-static transmission/reception which does not require scheduling DCI format.

If SubBand Full Duplex, SBFD, operation is introduced, another usage type of "SBFD" where "SBFD" represents simultaneous downlink transmission and uplink reception from the base station perspective.

RAN1 agrees that semistatic UL subband as baseline. Moreover, at least to control periodic/semi-persistent signals, dynamic activation/deactivation of UL subband should be available.

What is needed are methods, apparatus, and/or techniques to deal with allocation and/or mapping of radio resources for uplink channels in a duplex operation.

SUMMARY

In one of its example aspects the technology disclosed herein concerns a wireless terminal communicates across a radio interface with a radio access network. The wireless terminal comprises receiver circuitry and processor circuitry. The receiver circuitry is configured to receive from the radio access network (1) slot format information comprising transmission direction configuration for each symbol in a slot for an uplink (UL) subband; and (2) validation information. The processor circuitry is configured to use the validation information to perform validation or invalidation of the transmission direction configuration for at least a portion of the UL subband. Methods of operating wireless terminals according to example embodiments and modes are also disclosed.

In another of its example aspects the technology disclosed herein concerns an access node of a radio access network which communicates with a wireless terminal over a radio interface. In an example embodiment and mode, the access node comprises transmitter circuitry and receiver circuitry. The transmitter circuitry is configured to transmit to the wireless terminal: (1) slot format information comprising transmission direction configuration for each symbol in a slot for an uplink (UL) subband; and (2) validation information. The receiver circuitry is configured to receive from the wireless terminal information transmitted in symbols of the uplink subband according to the validation information. Methods of operating access nodes according to example embodiments and modes are also disclosed.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 11 shows an example configuration of DCI format 2_0.

FIG. 14 is a diagrammatic view showing an example expression of validation information according to an example embodiment and mode.

FIG. 15 is a diagrammatic view showing another example expression of validation information according to an example embodiment and mode.

FIG. 16 is a diagrammatic view showing another example expression of validation information according to an example embodiment and mode.

FIG. 17 is a diagrammatic view showing a resource allocation example for a PDSCH in a time-frequency subband grid.

DETAILED DESCRIPTION

Figure 1:
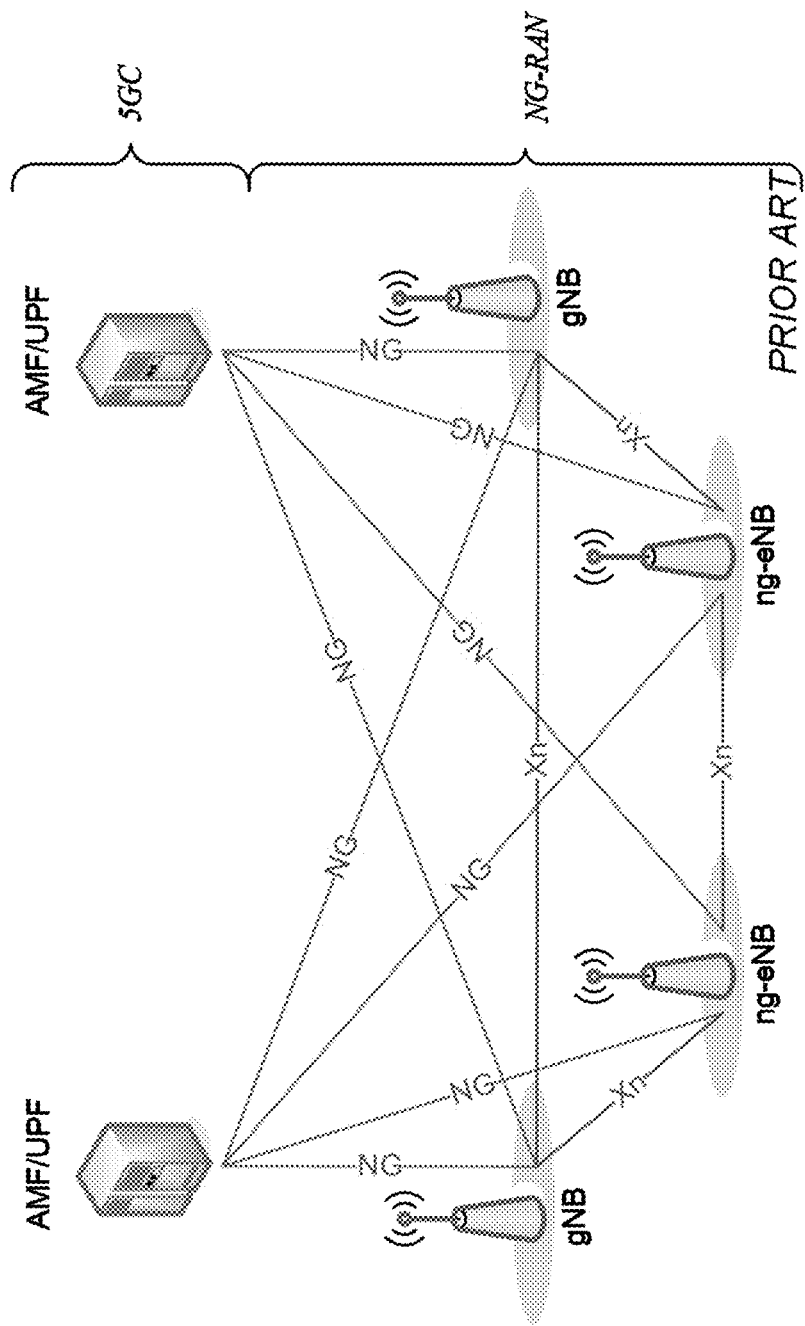
FIG. 1 is a diagrammatic view of overall architecture for a 5G New Radio system.
Figure 2:
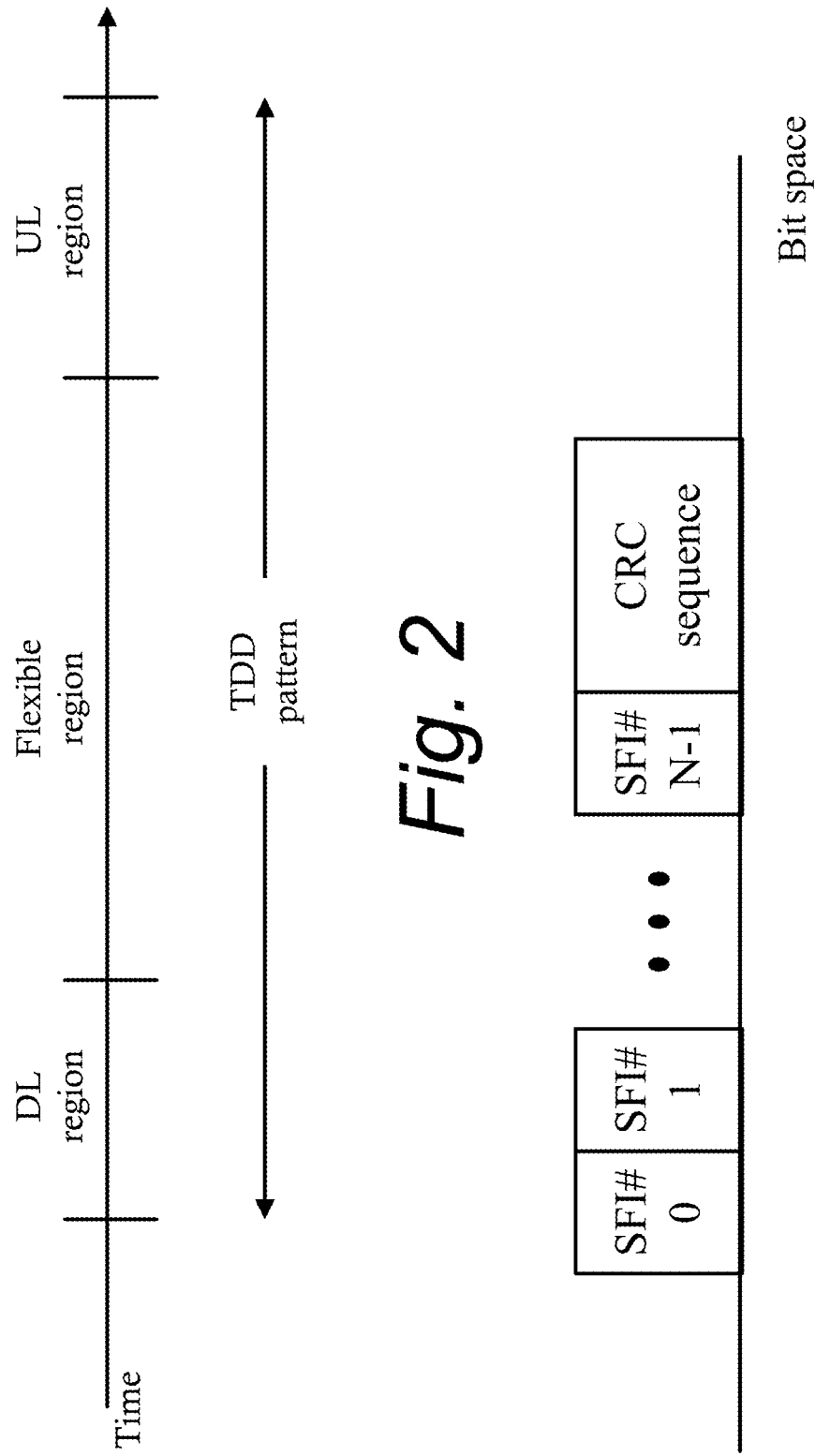
FIG. 2 is a diagrammatic view of an example of a TDD pattern for dynamic TDD operation.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel. All or a subset of the cell may be adopted by 3GPP as licensed bands, e.g., frequency band, to be used for communication between a base station, such as a Node B, and a UE terminal. A cellular network using frequency bands can include configured cells. Configured cells can include cells of which a UE terminal is aware and in which it is allowed by a base station to transmit or receive information. Examples of cellular radio access networks include E-UTRAN or New Radio, NR, and any successors thereof, e.g., NUTRAN.

A core network, CN, may comprise numerous servers, routers, and other equipment. As used herein, the term "core network" can refer to a device, group of devices, or subsystem in a telecommunication network that provides services to users of the telecommunications network. Examples of services provided by a core network include aggregation, authentication, call switching, service invocation, gateways to other networks, etc. For example, a core network (CN) may comprise one or more management entities, which may be an Access and Mobility Management Function, AMF.

As used herein, for a UE in IDLE Mode, a "serving cell" is a cell on which the wireless terminal in idle mode is camped. See, e.g., 3GPP TS 38.304. For a UE in RRC_CONNECTED not configured with carrier aggregation, CA/dual connectivity, DC, there is only one serving cell comprising the primary cell. For a UE in RRC_CONNECTED configured with CA/DC the term 'serving cells' is used to denote the set of cells comprising of the Special Cell(s) and all secondary cells. See, e.g., 3GPP TS 38.331.

Floor (CX) represents a floor function for real number CX. For example, floor (CX) may be a function that provides the largest integer within a range that does not exceed the real number CX. Ceil (DX) represents a ceiling function to a real number DX. For example, ceil (DX) maybe a function that provides the smallest integer within the range not less than the real number DX. Mod (EX, FX) represents a function that provides the remainder obtained by dividing EX by FX. It is exp (GX)=e^GX. Here, e is Napier number. (HX)^(IX) indicates IX to the power of HX.

In a wireless communication system according to one aspect of an example embodiment and mode, OFDM (Orthogonal Frequency Division Multiplex) is used. An OFDM symbol is a unit of time domain of OFDM. An OFDM symbol is converted to baseband signal in baseband signal generation. In downlink, at least CP-OFDM (Cyclic Prefix-Orthogonal Frequency Division Multiplex) is used. In uplink, either CP-OFDM or DFT-s-OFDM (Discrete Fourier Transform-spread-Orthogonal Frequency Division Multiplex) is used. DFT-s-OFDM is given by applying transform precoding to CP-OFDM. CP-OFDM is OFDM using CP (Cyclic Prefix).

Figure 3:
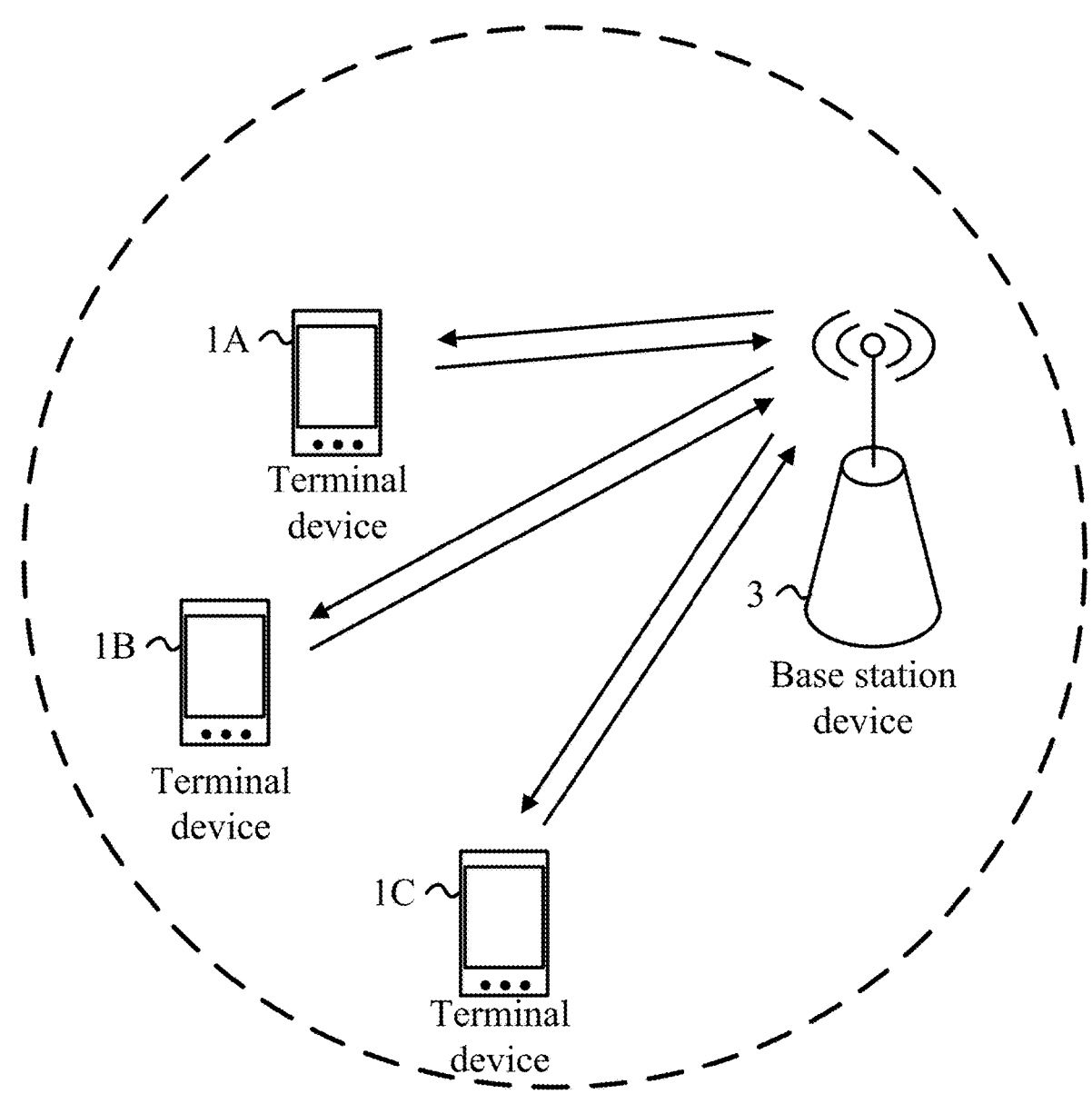
FIG. 3 is a conceptual diagram of a wireless communication system according to an aspect of an example embodiment and mode.

FIG. 3 is a conceptual diagram of a wireless communication system according to an aspect of an example embodiment and mode. In FIG. 3, the wireless communication system includes at least terminal devices 1A to 1C and a base station device 3 (BS #3: Base station #3). Hereinafter, the terminal devices 1A to 1C are also referred to as a terminal device 1 (UE #1: User Equipment #1).

The base station device 3 may be configured to include one or more transmission devices, e.g., transmission points, transmission devices, reception devices, transmission points, reception points. When the base station device 3 is configured by a plurality of transmission devices, each of the plurality of transmission devices may be arranged at a different position.

The base station device 3 may provide one or more serving cells. A serving cell may be defined as a set of resources used for wireless communication. A serving cell is also referred to as a cell.

A serving cell may be configured to include one downlink component carrier (downlink carrier) and/or one uplink component carrier (uplink carrier). A serving cell may be configured to include two or more downlink component carriers and/or two or more uplink component carriers. A downlink component carrier and an uplink component carrier are also referred to as component carriers (carriers).

For example, one component carrier may be associated with one or more resource grid. A resource grid includes $N^{size, u}_{grid, x} N^{RB}_{sc}$ subcarriers. The resource grid starts from a common resource block with index $N^{start, u}_{grid}$. The common resource block with the index $N^{start, u}_{grid}$ is also referred to as a reference point of the resource grid. The resource grid includes $N^{subframe, u}_{symb}$ OFDM symbols. The subscript x indicates the transmission direction and indicates either downlink or uplink. One resource grid is associated with an antenna port p, a subcarrier-spacing configuration u, and a transmission direction x. A subcarrier-spacing configuration u is also referred to as numerology.

$N^{start, u}_{grid, x}$ and $N^{start, u}_{grid}$ are given based on a higher-layer parameter (e.g., referred to as higher-layer parameter CarrierBandwidth). The higher-layer parameter CarrierBandwidth is used to define one or more SCS (SubCarrier-Spacing) specific carriers. Therefore, one resource grid corresponds to one SCS specific carrier. Further, one component carrier may be associated with one or more SCS specific carriers. The higher-layer parameter CarrierBandwidth may be a common parameter or UE-specific parameter. For each SCS specific carrier, a subcarrier-spacing configuration u is associated.

Table 1A and Table 1B show example relationships between subcarrier-spacing configuration u, the number of OFDM symbols per slot $N^{slot}_{symb}$, and the CP configuration according to an aspect of an example embodiment and mode. In Table 1A, for example, when the subcarrier-spacing configuration u is set to 2 and the CP configuration is set to normal CP (normal cyclic prefix), $N^{slot}_{symb}=14$, $N^{frame, u}_{slot}=40$, $N^{subframe, u}_{slot}=4$.

TABLE 1A

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Further, in Table 1B, for example, when the subcarrier-spacing configuration u is set to 2 and the CP configuration is set to an extended CP (extended cyclic prefix), $N^{slot}_{symb}=12$, $N^{frame, u}_{slot}=40$, $N^{subframe, u}_{slot}=4$.

TABLE 1B

| u | $N^{slot}_{symb}$ | $N^{frame,u}_{slot}$ | $N^{subframe,u}_{slot}$ |
|---|---|---|---|
| 2 | 12 | 40 | 4 |

In the wireless communication system according to an aspect of an example embodiment and mode, a time unit $T_c$ is used to represent the length of the time domain. The time unit $T_c$ calculated by $1/(df_{max}*N_f)$. $df_{max}$ represents 480 kHz. $N_f$ represents 4096. The constant k is $df_{max}*N_f/(df_{ref} N_{f, ref})=64$. $df_{ref}$ represents 15 kHz. $N_{f, ref}$ ref represents 2048.

Radio frames (system frames, frames) of length $T_f=(df_{max} N_f/100)*T_s$ '$_2$ 10 ms are defined in the time domain. One radio frame is configured to include ten subframes. The subframe length $T_{sf}$ is $(df_{max}N_f/1000) T_s=1$ ms. The number of OFDM symbols per subframe $N^{subframe, u}_{symb}$ is calculated by $N^{slot}_{symb} N^{subframe, u}_{slot}$.

Time domain index is provided. For example, slot index nus is provided in ascending order of the time domain in a subframe with an integer value ranging from 0 to $N^{subframe, u}_{slot}-1$. Also, the slot index $n^u_{s, f}$ is provided in ascending order of the time domain in a radio frame with an integer value ranging from 0 to $N^{frame, u}_{slot}-1$.

A slot is comprised of consecutive $N^{slot}_{symb}$ OFDM symbols.

Figure 4:
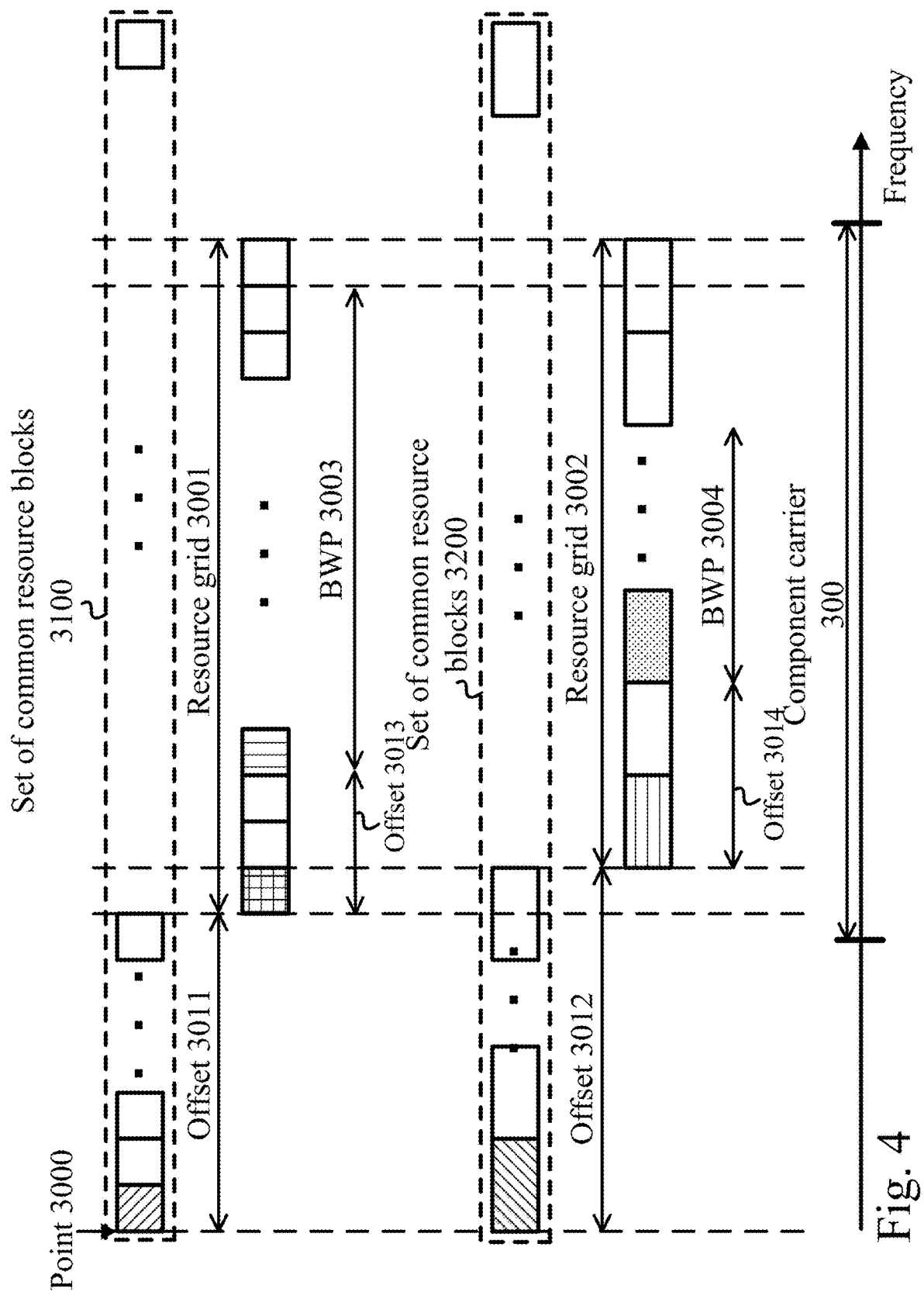
FIG. 4 is a diagrammatic view showing an example of a method of configuring a resource grid according to an aspect of an example embodiment and mode.

FIG. 4 is a diagram showing an example of a method of configuring a resource grid according to an aspect of an example embodiment and mode. The horizontal axis in FIG. 4 indicates frequency domain. FIG. 4 shows a configuration example of a resource grid of subcarrier-spacing configuration u=$u_1$ in the component carrier 300 and a configuration example of a resource grid of subcarrier-spacing configuration u=$u_2$ in a component carrier. Although it is assumed in FIG. 4 that $u_1=u_2-1$, various aspects of this embodiment are not limited to the condition of $u_1=u_2-1$.

In FIG. 4, the component carrier 300 is a band having a predetermined width in the frequency domain. However, various aspects of this embodiment are not limited to the component carrier 300 being a band. In another example, the component carrier 300 may be a virtual concept associated with Resource grid 3001 and 3002.

Point (Point) 3000 is an identifier for identifying a subcarrier. Point 3000 is also referred to as point A. The common resource block (CRB: Common resource block) set 3100 is a set of common resource blocks for the subcarrier-spacing configuration $u_1$.

Among the common resource block-set 3100, the common resource block including the point 3000 (the block indicated by the upper right diagonal line in FIG. 4) is also referred to as a reference point of the common resource block-set 3100. The reference point of the common resource block-set 3100 may be a common resource block with index 0 in the common resource block-set 3100.

The offset 3011 is an offset from the reference point of the common resource block-set 3100 to the reference point of the resource grid 3001. The offset 3011 is indicated by the number of common resource blocks which is relative to the subcarrier-spacing configuration $u_1$. Resource grid 3001 includes $N^{size, u}_{grid1, x}$ common resource blocks starting from the reference point of the resource grid 3001.

The offset 3013 is an offset from the reference point of the resource grid 3001 to the reference point ($N^{start, u}_{BWP, i1}$) of the BWP (BandWidth Part) 3003 of the index i1.

Common resource block-set 3200 is a set of common resource blocks with respect to subcarrier-spacing configuration $u_2$.

A common resource block including the point 3000 (a block indicated by a left-upward hatching in FIG. 4) in the common resource block-set 3200 is also referred to as a reference point of the common resource block-set 3200. The reference point of the common resource block-set 3200 may be a common resource block with index 0 in the common resource block-set 3200.

The offset 3012 is an offset from the reference point of the common resource block-set 3200 to the reference point of the resource grid 3002. The offset 3012 is indicated by the number of common resource blocks for subcarrier-spacing configuration $u=u_2$. Resource grid 3002 includes $N^{size, u}_{grid2, x}$ common resource blocks starting from the reference point of the resource grid 3002.

The offset 3014 is an offset from the reference point of the resource grid 3002 to the reference point ($N^{start, u}_{BWP, i2}$) of the BWP 3004 with index $i_2$.

Figure 5:
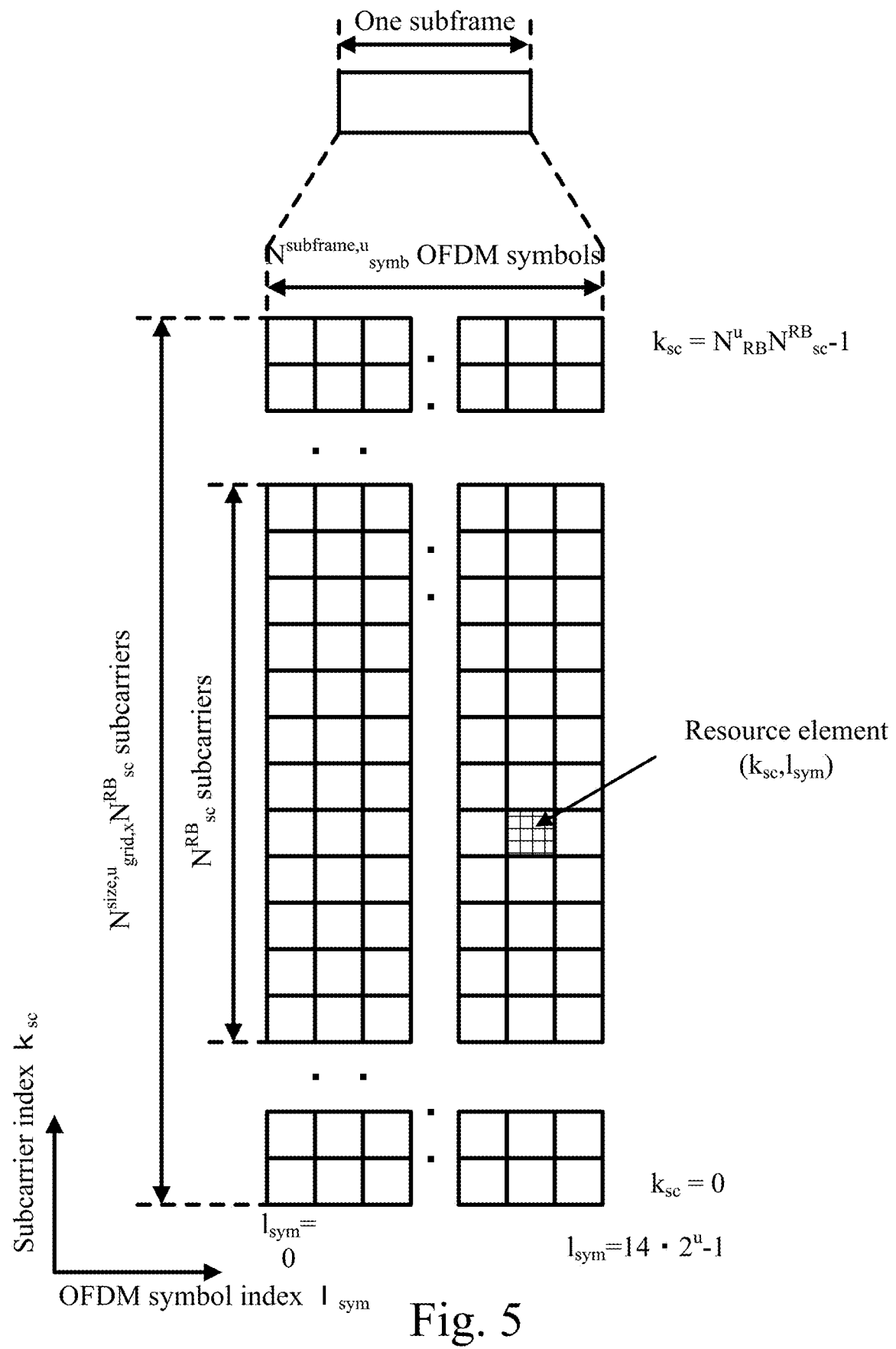
FIG. 5 is a diagram showing a configuration example of a resource grid according to an aspect of an example embodiment and mode.

FIG. 5 is a diagram showing a configuration example of a resource grid 3001 according to an aspect of an example embodiment and mode. In the resource grid of FIG. 5, the horizontal axis indicates OFDM symbol index $l_{sym}$, and the vertical axis indicates the subcarrier index $k_{sc}$. The resource grid 3001 includes $N^{size, u}_{grid1, x} N^{RB}_{sc}$ subcarriers, and includes $N^{subframes, u}_{symb}$ OFDM symbols. A resource specified by the subcarrier index $k_{sc}$ and the OFDM symbol index $l_{sym}$ in a resource grid is also referred to as a resource element (RE: Resource Element).

A resource block (RB: Resource Block) includes $N^{RB}_{sc}$ consecutive subcarriers. A resource block is a generic name of a common resource block (CRB: Common Resource Block), a physical resource block (PRB: Physical Resource Block), and a virtual resource block (VRB: Virtual Resource Block). For example, $N^{RB}_{sc}$ may be 12.

A resource block unit is a set of resources that corresponds to one OFDM symbol in one resource block. That is, one resource block unit includes 12 resource elements which corresponds to one OFDM symbol in one resource block.

Common resource blocks for a subcarrier-spacing configuration u are indexed in ascending order from 0 in the frequency domain in a common resource block-set. The common resource block with index 0 for the subcarrier-spacing configuration u includes (or collides with, matches) the subcarrier corresponding to the point 3000. The index $n^u_{CRB}$ of the common resource block with respect to the subcarrier-spacing configuration u satisfies the relationship of $n^u_{CRB} = \text{ceil}(k_{sc}/N^{RB}_{sc})$. The subcarrier with $k_{sc}=0$ is a subcarrier with the same center frequency as the center frequency of the subcarrier which corresponds to the point 3000.

Physical resource blocks for a subcarrier-spacing configuration u are indexed in ascending order from 0 in the frequency domain in a BWP. The index $n^u_{PRB}$ of the physical resource block with respect to the subcarrier-spacing configuration u satisfies the relationship of $n^u_{CRB} = n^u_{PRB} + N^{start, u}_{BWP, i}$. The $N^{start, u}_{BWP, i}$ indicates the reference point of BWP with index i.

A BWP is defined as a subset of common resource blocks in the resource grid. The BWP includes $N^{size, u}_{BWP, i}$ common resource blocks starting at the reference points $N^{start, u}_{BWP, i}$. A BWP for the downlink component carrier is also referred to as a downlink BWP. A BWP for the uplink component carrier is also referred to as an uplink BWP.

An antenna port is defined such that the channel over which a symbol on the antenna port is conveyed can be inferred from the channel over which another symbol on the same antenna port is conveyed. For example, the channel may correspond to a physical channel. For example, the symbols may correspond to OFDM symbols. For example, the symbols may correspond to resource block units. For example, the symbols may correspond to resource elements.

Two antenna ports are said to be QCL (Quasi Co-Located) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

Carrier aggregation is a framework for communication using a plurality of aggregated serving cells. In other expression, carrier aggregation may be understood as a framework for communication using a plurality of aggregated component carriers.

Figure 6:
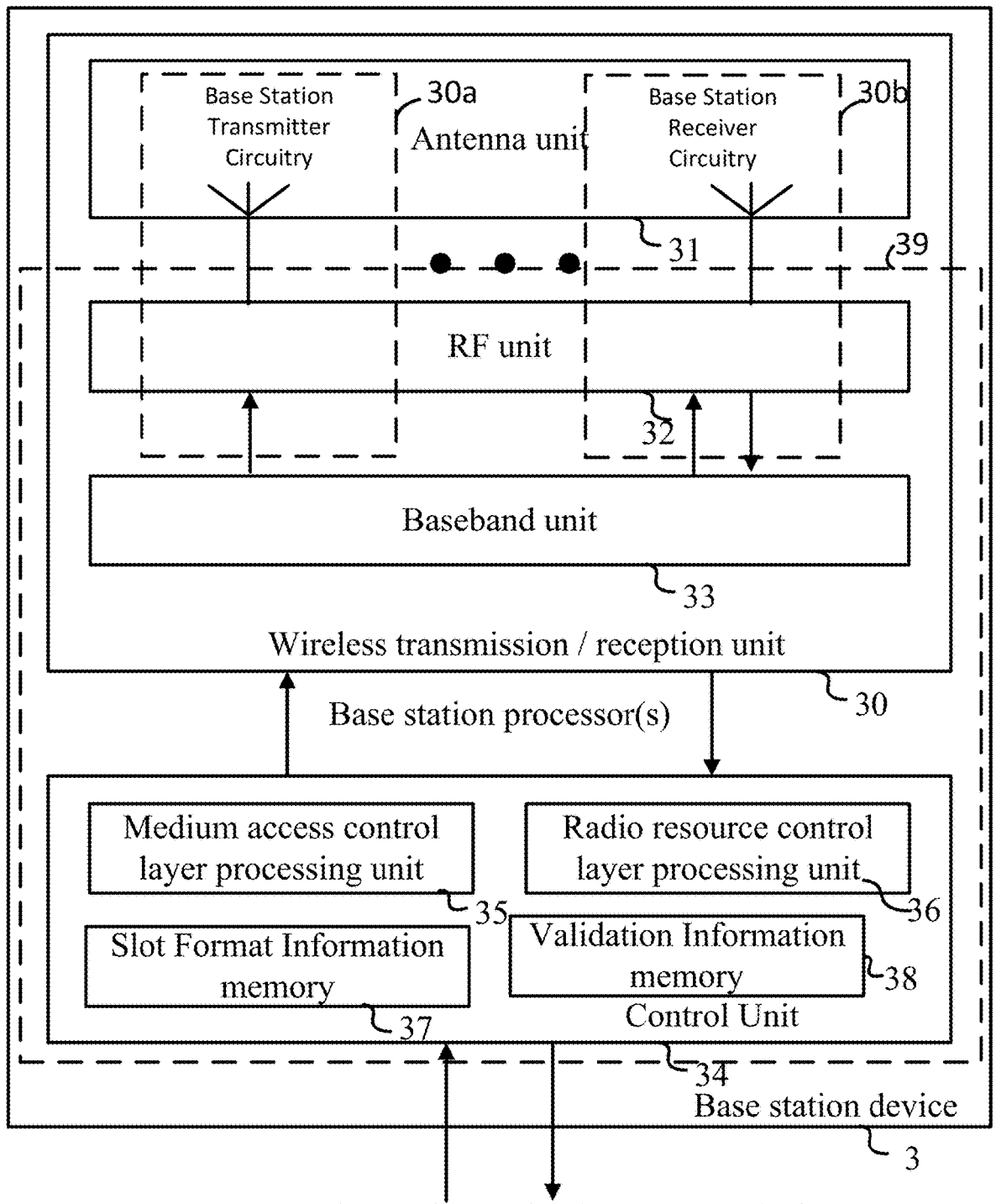
FIG. 6 is a schematic block diagram showing a configuration example of the base station device 3 according to an aspect of an example embodiment and mode.

FIG. 6 is a schematic block diagram showing a configuration example of an access node or base station device 3 according to an aspect of an example embodiment and mode. As shown in FIG. 6, base station device 3 includes a part or all of the wireless transmission/reception unit (physical layer processing unit) 30 and the control unit 34. The wireless transmission/reception unit 30 includes a part or all of the antenna unit 31, the RF unit 32 (Radio Frequency unit 32), and the baseband unit 33. The control unit 34 includes a part or all of the medium access control layer processing unit 35 and the radio resource control (RRC: Radio Resource Control) layer processing unit 36.

The wireless transmission/reception unit 30 includes a part of or all of a wireless transmission unit 30a and a wireless reception unit 30b. The configuration of the baseband unit 33 included in the wireless transmission unit 30a and the configuration of the baseband unit 33 included in the wireless reception unit 30b may be the same or different. The configuration of the RF unit 32 included in the wireless transmission unit 30a and the configuration of the RF unit 32 included in the wireless reception unit 30b may be the same or different. The configuration of the antenna unit 31 included in the wireless transmission unit 30a and the configuration of the antenna unit 31 included in the wireless reception unit 30b may be the same or different.

The control unit 34 provides downlink data (or transport blocks) to the wireless transmission/reception unit 30 (or the wireless transmission unit 30a). Control unit 34 performs processing of a medium access control (MAC) layer, a packet data convergence protocol layer (PDCP layer), a radio link control layer (RLC layer) and/or an RRC layer.

The medium access control layer processing unit 35 included in the control unit 34 performs processing of the MAC layer.

The radio resource control layer processing unit 36 included in control unit 34 performs the process of the RRC layer. The radio resource control layer processing unit 36 manages various configuration information/parameters (RRC parameters) of terminal device 1.

The control unit 34 may also comprise slot format information memory 37 and validation information memory 38, having functions described herein. The slot format information memory 37 may store the slot format information, such as information obtained from contents of the downlink control information. The validation information memory 38 may store information pertaining to how validation of the transmission direction configuration for at least a portion of the UL subband is to be provided to terminal device 1, also known as wireless terminal 1. As described below, such validation information may be reflected in such ways as content of the slot format information, manner of scrambling of a cyclic redundancy check field of the slot format information, for example. Moreover, the slot format information stored in slot format information memory 37 may either be received by the base station 3 from a core network or elsewhere or be generated at the base station 3 for storage in slot format information memory 37 and use by the base station 3. Likewise, the validation information stored in validation information memory 38 may either be received by the base station 3 from a core network or elsewhere or be generated at the base station 3 for storage in validation information memory 38 and use by the base station 3.

Various functionalities of base station 3 may be performed by one or more processor(s) 39, also referred to herein as base station or access node processor circuitry. For example, base station processor(s) 39 may comprise or at least partially constitute the control unit 34, base band unit 33, and possibly portions of RF unit 32.

The wireless transmission/reception unit 30 (or the wireless transmission unit 30a) performs processing such as encoding and modulation. The wireless transmission/reception unit 30 (or the wireless transmission unit 30a) generates a physical signal by encoding and modulating the downlink data. The wireless transmission/reception unit 30 (or the wireless transmission unit 30a) converts the physical signal to a baseband signal by baseband signal generation. The wireless transmission/reception unit 30 (or the wireless transmission unit 30a) transmits the baseband signal to the terminal device 1 via radio frequency. The wireless transmission/reception unit 30 (or the wireless transmission unit 30a) may arrange the baseband signal on a component carrier and transmit the baseband signal to the terminal device 1.

The wireless transmission/reception unit 30 (or the wireless reception unit 30b) performs processing such as demodulation and decoding. The wireless transmission/reception unit 30 (or the wireless reception unit 30b) separates, demodulates and decodes the received physical signal, and provides the decoded information to the control unit 34. The wireless transmission/reception unit 30 (or the wireless reception unit 30b) may perform the channel access procedure prior to the transmission of the physical signal.

The RF unit 32 demodulates the physical signal received via the antenna unit 31 into an analog signal, and/or removes extra frequency components. The RF unit 32 provides the processed analog signal to the baseband unit 33.

Baseband unit 33 converts the analog signal input from the RF unit 32 into a baseband signal. The baseband unit 33 separates a portion which corresponds to CP (Cyclic Prefix) from the baseband signal. The baseband unit 33 performs Fast Fourier Transformation (FFT) on the baseband signal from which the CP has been removed.

The baseband unit 33 performs Inverse Fast Fourier Transformation (IFFT) on downlink data to generate an OFDM symbol, adds a CP to the generated OFDM symbol, generates a baseband signal, and converts the baseband signal into an analog signal. The baseband unit 33 provides the analog signal to the RF unit 32.

The RF unit 32 removes extra frequency components from the analog signal input from the baseband unit 33, up-converts the analog signal to a radio frequency and transmits it via the antenna unit 31. The RF unit 32 may have a function of controlling transmission power. The RF unit 32 is also referred to as a transmission power control unit.

One or more serving cells are configured for terminal device 1.

There are different types of serving cells. For example, there are PCell (Primary cell), PSCell (Primary SCG cell), and SCell (Secondary Cell).

A PCell is a serving cell included in a MCG (Master Cell Group). A PCell is a cell (implemented cell) which performs an initial connection establishment procedure or a connection re-establishment procedure by terminal device 1.

A PSCell is a serving cell included in a SCG (Secondary Cell Group). A PSCell is a serving cell in which random-access is performed by the terminal device 1 in a reconfiguration procedure with synchronization (Reconfiguration with synchronization).

A SCell may be included in either a MCG or a SCG.

The serving cell group (cell group) is a designation including at least MCG and SCG. The serving cell group may include one or more serving cells. Serving cells included in the serving cell group may be operated by carrier aggregation.

One or more downlink BWPs may be configured for each serving cell (or each downlink component carrier). One or more uplink BWPs may be configured for each serving cell (or each uplink component carrier).

Among the one or more downlink BWPs set for the serving cell (or the downlink component carrier), one downlink BWP may be set as an active downlink BWP (or one downlink BWP may be activated). Among the one or more uplink BWPs set for the serving cell (or the uplink component carrier), one uplink BWP may be set as an active uplink BWP (or one uplink BWP may be activated).

A PDSCH, a PDCCH, and a CSI-RS may be received in the active downlink BWP. The terminal device 1 may receive the PDSCH, the PDCCH, and the CSI-RS in the active downlink BWP. A PUCCH and a PUSCH may be sent on the active uplink BWP. terminal device 1 may transmit the PUCCH and the PUSCH in the active uplink BWP. The active downlink BWP and the active uplink BWP are also referred to as active BWP.

The PDSCH, the PDCCH, and the CSI-RS may not be received in downlink BWPs other than the active downlink BWP. The terminal device 1 may not receive the PDSCH, the PDCCH, and the CSI-RS in the downlink BWPs other than the active downlink BWP. The PUCCH and the PUSCH may not be transmitted in uplink BWPs other than the active uplink BWP. The terminal device 1 may not transmit the PUCCH and the PUSCH in the uplink BWPs other than the active uplink BWP.

Downlink BWP switching deactivates an active downlink BWP and activates one of downlink BWPs other than the active downlink BWP. The downlink BWP switching may be controlled by a BWP field included in a downlink control information. The downlink BWP switching may be controlled based on higher-layer parameters.

Uplink BWP switching is used to deactivate an active uplink BWP and activate any uplink BWP other than the active uplink BWP. Uplink BWP switching may be controlled by a BWP field included in a downlink control information. The uplink BWP switching may be controlled based on higher-layer parameters.

Among the one or more downlink BWPs set for the serving cell, two or more downlink BWPs may not be set as active downlink BWPs at a time. For the serving cell, at most one downlink BWP may be active at a time.

Among the one or more uplink BWPs set for the serving cell, two or more uplink BWPs may not be set as active uplink BWPs at a time. For the serving cell, one uplink BWP may be active at a time.

Figure 7:
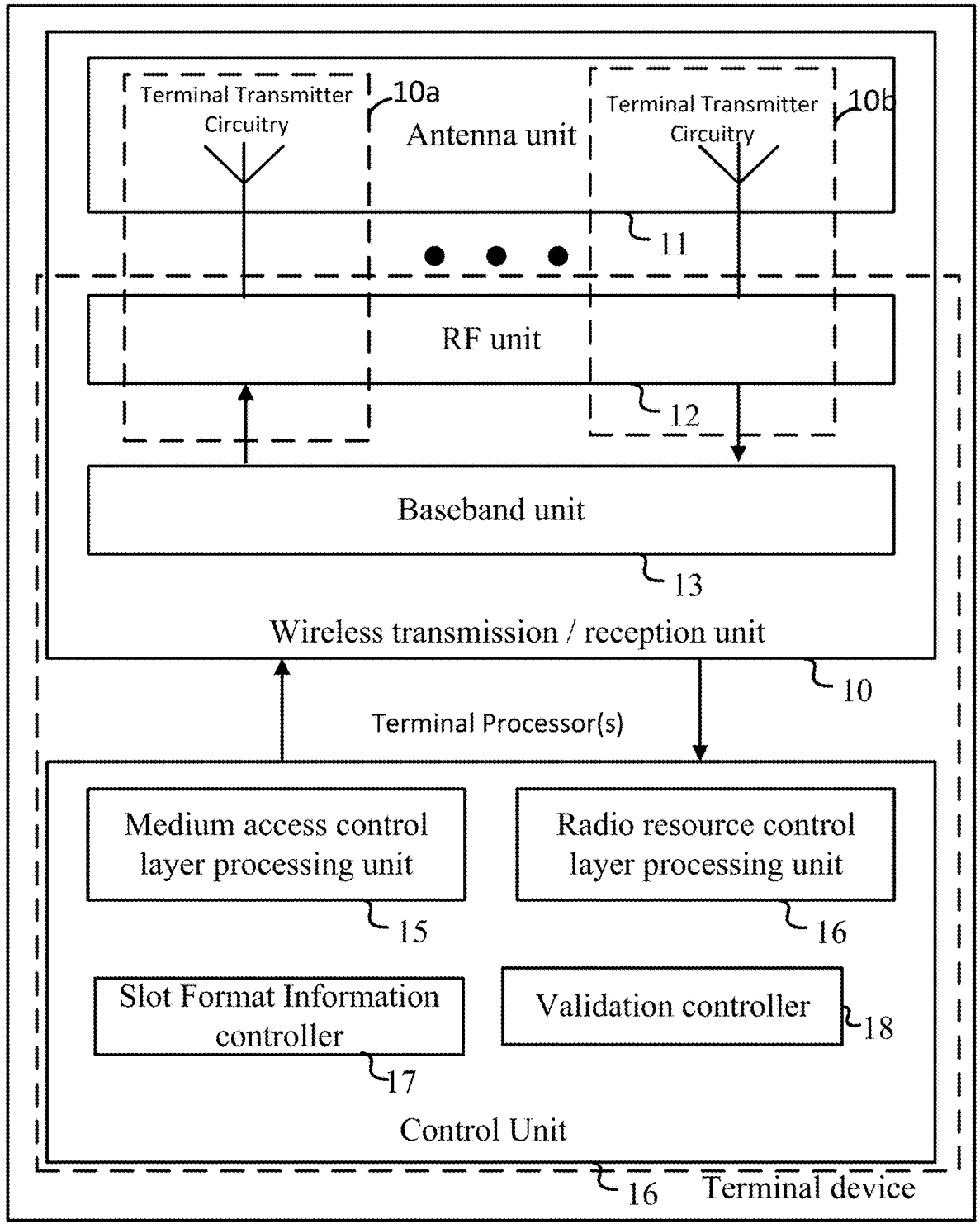
FIG. 7 is a schematic block diagram showing a configuration example of an example wireless terminal, UE, or terminal device according to an aspect of an example embodiment and mode.

FIG. 7 is a schematic block diagram showing a configuration example of an example wireless terminal, also known as a UE or terminal device 1, according to an aspect of an example embodiment and mode. As shown in FIG. 7, terminal device 1 includes a part or all of the wireless transmission/reception unit (physical layer processing unit) 10 and the control unit 14. The wireless transmission/reception unit 10 includes a part or all of the antenna unit 11, the RF unit 12, and the baseband unit 13. The control unit 14 includes a part or all of the medium access control layer processing unit 15 and the radio resource control layer processing unit 16.

The wireless transmission/reception unit 10 includes a part of or all of a wireless transmission unit 10a and a wireless reception unit 10b. The wireless transmission unit 10a may also be referred to as wireless terminal transmitter circuitry and wireless reception unit 10b may also be referred to as wireless terminal receiver circuitry. The configuration of the baseband unit 13 included in the wireless transmission unit 10a and the configuration of the baseband unit 13 included in the wireless reception unit 10b may be the same or different. The configuration of the RF unit 12 included in the wireless transmission unit 10a and the RF unit 12 included in the wireless reception unit 10b may be the same or different. The configuration of antenna unit 11 included in the wireless transmission unit 10a and the configuration of the antenna unit 11 included in the wireless reception unit 10b may be the same or different.

The control unit 14 provides uplink data (or transport blocks) to the wireless transmission/reception unit 10 (or the wireless transmission unit 10a). Control unit 14 performs processing of a MAC layer, a packet data integration protocol layer, a radio link control layer, and/or an RRC layer.

The control unit 14 may also comprise slot format information controller 17 and validation controller 18. The slot format information controller 17 may serve to interpret the slot format information received from base station 3 in order to ascertain transmission direction configuration, and particularly transmission direction configuration for each symbol in a slot for an uplink (UL) subband. The validation controller 18 may serve to perform a validation operation for the transmission direction configuration for the UL subband. For example, validation controller 18 uses the validation information to perform validation or invalidation of the transmission direction configuration for at least a portion of the UL subband.

As used herein, "validation" means that the affected symbol of the UL subband can be used for the uplink. On the other hand, "Invalidation" means that UL subband is not used for the uplink in the slot/symbol. In the case of an invalidation, the wireless terminal defaults to a direction configuration in a case that the UL subband is not configured. For examples: (1) in a case that a slot is configured with a UL subband, and the slot is "downlink", then "invalidation" implies that the UE follows "downlink" behavior; (2) in a case that a slot is configured with a UL subband, and the slot is "flexible", then "invalidation" implies that the UE follows "flexible" behavior.

Various functionalities of wireless terminal 1 may be performed by one or more processor(s) 19, also referred to herein as wireless terminal or terminal processor circuitry. For example, wireless terminal processor(s) 19 may comprise or at least partially constitute the control unit 14, base band unit 13, and possibly portions of RF unit 12.

The medium access control layer processing unit 15 included in the control unit 14 performs processing of the MAC layer.

The radio resource control layer processing unit 16 included in control unit 14 performs the process of the RRC layer. The radio resource control layer processing unit 16 manages various configuration information/parameters (RRC parameters) of terminal device 1. The radio resource control layer processing unit 16 configures RRC parameters based on the RRC message received from the base station device 3.

The wireless transmission/reception unit 10 (or the wireless transmission unit 10a) performs processing such as encoding and modulation. The wireless transmission/reception unit 10 (or the wireless transmission unit 10a) generates a physical signal by encoding and modulating the uplink data. The wireless transmission/reception unit 10 (or the wireless transmission unit 10a) converts the physical signal to a baseband signal by baseband signal generation. The wireless transmission/reception unit 10 (or the wireless transmission unit 10a) transmits the baseband signal to the base station device 3 via radio frequency. The wireless transmission/reception unit 10 (or the wireless transmission unit 10a) may arrange the baseband signal on a BWP (active uplink BWP) and transmit the baseband signal to the base station device 3.

The wireless transmission/reception unit 10 (or the wireless reception unit 10b) performs processing such as demodulation and decoding. The wireless transmission/reception unit 10 (or the wireless reception unit 10b) may receive a physical signal in a BWP (active downlink BWP) of a serving cell. The wireless transmission/reception unit 10 (or the wireless reception unit 10b) separates, demodulates and decodes the received physical signal, and provides the decoded information to the control unit 14. The wireless transmission/reception unit 10 (or the wireless reception unit 10b) may perform the channel access procedure prior to the transmission of the physical signal.

The RF unit 12 demodulates the physical signal received via the antenna unit 11 into an analog signal, and/or removes extra frequency components. The RF unit 12 provides the processed analog signal to the baseband unit 13.

The baseband unit 13 converts the analog signal input from the RF unit 12 into a baseband signal. The baseband unit 13 separates a portion which corresponds to CP from the baseband signal, performs fast Fourier transformation on the baseband signal from which the CP has been removed.

The baseband unit 13 performs inverse fast Fourier transformation on uplink data to generate an OFDM symbol, adds a CP to the generated OFDM symbol, generates a baseband signal, and convert the digital signal into an analog signal. The baseband unit 13 provides the analog signal to the RF unit 12.

The RF unit 12 removes extra frequency components from the analog signal input from the baseband unit 13, up-converts the analog signal to a radio frequency and transmits it via the antenna unit 11 The RF unit 12 may have a function of controlling transmission power. The RF unit 12 is also referred to as a transmission power control unit.

Hereinafter, physical signals will be described.

Physical signal is a generic term for downlink physical channels, downlink physical signals, uplink physical channels, and uplink physical channels. The physical channel is a generic term for downlink physical channels and uplink physical channels.

An uplink physical channel corresponds to a set of resource elements that carry information originating from the higher-layer and/or uplink control information. The uplink physical channel is transmitted by terminal device 1. The uplink physical channel is received by the base station device 3. In the wireless communication system according to one aspect of an example embodiment and mode, a part or all of PUCCH (Physical Uplink Control CHannel), PUSCH (Physical Uplink Shared CHannel), and PRACH (Physical Random Access CHannel) may be used.

A PUCCH is sent to deliver (transmission, convey) uplink control information. The terminal device 1 transmits a PUCCH in which uplink control information is arranged. The base station device 3 receives the PUCCH in which the uplink control information is arranged.

Uplink control information (uplink control information bits, uplink control information sequence, uplink control information type) includes a part or all of channel state information (CSI: Channel State Information), scheduling request (SR: Scheduling Request), and HARQ-ACK (Hybrid Automatic Repeat request ACKnowledgement) information.

HARQ-ACK information indicates HARQ-ACK status corresponding to a transport block (TB: Transport block, MAC PDU: Medium Access Control Protocol Data Unit, DL-SCH: Downlink-Shared Channel, UL-SCH: Uplink-Shared Channel, PDSCH: Physical Downlink Shared CHannel, PUSCH: Physical Uplink Shared CHannel). The HARQ-ACK status is either ACK (acknowledgement) or NACK (negative-acknowledgement). The ACK indicates that the transport block has been successfully decoded. The NACK indicates that the transport block has not been successfully decoded. HARQ-ACK information may include a HARQ-ACK codebook that includes one or more HARQ-ACK status (or HARQ-ACK bits).

HARQ-ACK status may indicate ACK or NACK which correspond to one CBG (Code Block Group) included in the transport block.

The scheduling request is used to request UL-SCH resources for initial transmission. The scheduling request is used to indicate either a positive SR or a negative SR. The fact that the scheduling request indicates a positive SR is also referred to as "a positive SR is sent". The positive SR indicates that the UL-SCH resource for initial transmission is requested by terminal device 1. The fact that the scheduling request bit indicates a negative SR is also referred to as "a negative SR is sent". A negative SR indicates that the UL-SCH resource for initial transmission is not requested by terminal device 1.

The channel state information may include at least part or all of a channel quality indicator (CQI), a precoder matrix indicator (PMI), and a rank indicator (RI). CQI is an indicator related to channel quality (e.g., propagation quality) or physical channel quality, and PMI is an indicator related to a precoder. RI is an indicator related to transmission rank (or the number of transmission layers).

Channel state information is provided based on receiving one or more physical signals (e.g., one or more CSI-RSs). The channel state information is determined by the terminal device 1 based on receiving one or more physical signals.

A PUSCH is used to convey uplink data (a transport block) and/or uplink control information. The terminal device 1 transmits a PUSCH in which uplink data (a transport block) and/or uplink control information is arranged. The base station device 3 receives a PUSCH in which uplink data (a transport block) and/or uplink control information is arranged.

A PRACH is used to transmit a random-access preamble. The sequence $x_{u,v}(n)$ of the PRACH is defined by $x_{u,v}(n)=x_u(\mod (n+C_v, L_{RA}))$. The $x_u$ may be a ZC sequence (Zadoff-Chu sequence). The $x_u$ may be defined by $x_u=\exp(-jpui(i+1)/L_{RA})$. The j is an imaginary unit. The p is the circle ratio. The $C_v$ corresponds to cyclic shift of the PRACH. $L_{RA}$ corresponds to the length of the PRACH. The $L_{RA}$ may be 839 or 139 or another value. The i is an integer in the range of 0 to $L_{RA}-1$. The u is a sequence index for the PRACH. The terminal device 1 transmits the PRACH. The base station device 3 receives the PRACH.

For a given PRACH occasion, 64 random-access preambles are defined. The random-access preamble is specified (determined, given) based on the cyclic shift $C_v$ of the PRACH and the sequence index u for the PRACH.

An uplink physical signal corresponds to a set of resource elements. The uplink physical signal may not carry information generated in the higher-layer. The terminal device 1 transmits an uplink physical signal. The base station device 3 receives the uplink physical signal. In the radio communication system according to one aspect of an example embodiment and mode, at least a part or all of UL DMRS (UpLink Demodulation Reference Signal), SRS (Sounding Reference Signal), UL PTRS (UpLink Phase Tracking Reference Signal) may be used.

UL DMRS is a generic name of a DMRS for a PUSCH and a DMRS for a PUCCH.

A set of antenna ports of a DMRS for a PUSCH (a DMRS associated with a PUSCH, a DMRS included in a PUSCH, a DMRS which corresponds to a PUSCH) may be given based on a set of antenna ports for the PUSCH. For example, the set of DMRS antenna ports for the PUSCH may be the same as the set of antenna ports for the PUSCH.

Transmission of a PUSCH and transmission of a DMRS for the PUSCH may be indicated (or scheduled) by one DCI format. The PUSCH and the DMRS for the PUSCH is collectively referred to as a PUSCH.

A set of antenna ports of a DMRS for a PUCCH (a DMRS associated with a PUCCH, a DMRS included in a PUCCH, a DMRS which corresponds to a PUCCH) may be identical to a set of antenna ports for the PUCCH.

Transmission of a PUCCH and transmission of a DMRS for the PUCCH may be indicated (or triggered) by one DCI format. The arrangement of the PUCCH in resource elements (resource element mapping) and/or the arrangement of the DMRS in resource elements for the PUCCH may be provided by one PUCCH format. The PUCCH and the DMRS for the PUCCH is collectively referred to as PUCCH.

A downlink physical channel corresponds to a set of resource elements that carry information originating from the higher-layer and/or downlink control information. The base station device 3 transmits the downlink physical channel. The terminal device 1 receives the downlink physical channel. In the wireless communication system according to one aspect of an example embodiment and mode, a part or all of PBCH (Physical Broadcast Channel), PDCCH (Physical Downlink Control Channel), and PDSCH (Physical Downlink Shared Channel) may be used.

The PBCH is used to transmit a MIB (Master Information Block) and/or physical layer control information. The physical layer control information is a kind of downlink control information. The terminal device 1 receives the PBCH. The base station device 3 transmits the PBCH. The physical layer control information is also referred to as a PBCH payload Physical layer control information comprises of 8 bits. The physical layer control information comprises of a part or all of 0A to 0D. The 0A is radio frame information. The 0B is half radio frame information (half system frame information). The 0C is SS/PBCH block index information. The 0D is subcarrier offset information.

The radio frame information is used to indicate a radio frame in which the PBCH is transmitted.

The half radio frame information is used to indicate whether the PBCH is transmitted in first five subframes or in second five subframes among radio frames in which the PBCH is transmitted.

The SS/PBCH block index information is used to indicate an SS/PBCH block index.

The subcarrier offset information is used to indicate subcarrier offset. The subcarrier offset information is used to indicate the difference between the first subcarrier in which the PBCH is arranged and the first subcarrier in which the control resource set with index 0 is arranged.

A PDCCH is used to transmit downlink control information (DCI). The terminal device 1 receives a PDCCH in which downlink control information is arranged. The base station device 3 transmits the PDCCH in which the downlink control information is arranged.

Downlink control information is formatted by a DCI format. There may be several DCI format types, such as DCI format 0_0, DCI format 0_1, DCI format 1_0, DCI format 1_1, DCI format 2_0, discussed herein as non-limiting examples.

DCI format is a generic name for DCI format 0_0, DCI format 0_1, DCI format 1_0, and DCI format 1_1. Uplink DCI format is a generic name of the DCI format 0_0 and the DCI format 0_1. Downlink DCI format is a generic name of the DCI format 1_0 and the DCI format 1_1.

The DCI format 0_0 is used for scheduling a PUSCH for a cell (or a PUSCH arranged on a cell). The DCI format 0_0 includes a part or all of fields 1A to 1E. The 1A is a DCI format identification field (Identifier field for DCI formats). The 1B is a frequency domain resource assignment field (FDRA field). The 1C is a time domain resource assignment field (TDRA field). The 1D is a frequency-hopping flag field. The 1E is an MCS field (Modulation-and-Coding-Scheme field).

The DCI format identification field in the DCI format 0_0 indicates whether the DCI format including the DCI format identification field is an uplink DCI format or a downlink DCI format. The DCI format identification field included in the DCI format 0_0 indicates 0 (or indicates that the DCI format 0_0 is an uplink DCI format).

The frequency domain resource assignment field included in the DCI format 0_0 is used to indicate the assignment of frequency resources for a PUSCH scheduled by the DCI format 0_0.

The time domain resource assignment field included in the DCI format 0_0 is used to indicate the assignment of time resources for a PUSCH scheduled by the DCI format 0_0.

The frequency-hopping flag field in the DCI format 0_0 is used to indicate whether frequency-hopping is applied to a PUSCH scheduled by the DCI format 0_0.

The MCS field included in the DCI format 0_0 is used to indicate a modulation scheme for a PUSCH scheduled by the DCI format 0_0 and/or a part or all of a target coding rate for the PUSCH. A size of a transport block (TBS: Transport Block Size) of the PUSCH is determined based on a target coding rate and a part or all of a modulation scheme for the PUSCH.

The DCI format 0_0 does not include fields used for requesting CSI.

The DCI format 0_0 does not include a carrier indicator field. An uplink component carrier on which a PUSCH scheduled by the DCI format 0_0 is arranged is the same as an uplink component carrier on which a PDCCH including the DCI format 0_0 is arranged.

The DCI format 0_0 does not include a BWP field. Active uplink BWP does not change by the DCI format 0_0.

The DCI format 0_1 is used for scheduling of a PUSCH for a cell (or arranged on a cell). The DCI format 0_1 includes a part or all of fields 2A to 2H. The 2A is a DCI format identification field. The 2B is a frequency domain resource assignment field. The 2C is a time domain resource assignment field. The 2D is a frequency-hopping flag field. The 2E is an MCS field. The 2F is a CSI request field. The 2G is a BWP field. The 2H is a carrier indicator field.

The DCI format identification field included in the DCI format 0_1 indicates 0 (or indicates that the DCI format 0_1 is an uplink DCI format).

The frequency domain resource assignment field included in the DCI format 0_1 is used to indicate the assignment of frequency resources for a PUSCH scheduled by the DCI format.

The time domain resource assignment field included in the DCI format 0_1 is used to indicate the assignment of time resources for a PUSCH scheduled by the DCI format.

The frequency-hopping flag field in the DCI format 0_1 is used to indicate whether frequency-hopping is applied to a PUSCH scheduled by the DCI format 0_1.

The MCS field included in the DCI format 0_1 is used to indicate a modulation scheme for a PUSCH scheduled by the DCI format and/or a part or all of a target coding rate for the PUSCH.

When the DCI format 0_1 includes the BWP field, the BWP field may be used to indicate an uplink BWP on which a PUSCH scheduled by the DCI format 0_1 is arranged, depending on capability of the terminal device 1. When the DCI format 0_1 does not include the BWP field, active uplink BWP does not change by the DCI format 0_1.

The CSI request field is used to request CSI.

If the DCI format 0_1 includes the carrier indicator field, the carrier indicator field is used to indicate an uplink component carrier (or a serving cell) on which a PUSCH is arranged. When the DCI format 0_1 does not include the carrier indicator field, a serving cell on which a PUSCH is arranged is the same as the serving cell on which a PDCCH including the DCI format 0_1 used for scheduling of the PUSCH is arranged.

The DCI format 1_0 is used for scheduling of a PDSCH for a cell (arranged on a cell). The DCI format 1_0 includes a part or all of fields 3A to 3F. The 3A is a DCI format identification field. The 3B is a frequency domain resource assignment field. The 3C is a time domain resource assignment field. The 3D is an MCS field. The 3E is a PDSCH-to-HARQ-feedback indicator field. The 3F is a PUCCH resource indicator field.

The DCI format identification field included in the DCI format 1_0 indicates 1 (or indicates that the DCI format 1_0 is a downlink DCI format).

The frequency domain resource assignment field included in the DCI format 1_0 is used to indicate the assignment of frequency resources for a PDSCH scheduled by the DCI format 1_0.

The time domain resource assignment field included in the DCI format 1_0 is used to indicate the assignment of time resources for a PDSCH scheduled by the DCI format 1_0.

The MCS field included in the DCI format 1_0 is used to indicate a modulation scheme for a PDSCH scheduled by the DCI format 1_0 and/or a part or all of a target coding rate for the PDSCH. A size of a transport block (TBS: Transport Block Size) of a PDSCH is determined based on a target coding rate and a part or all of a modulation scheme for the PDSCH.

The PDSCH-to-HARQ-feedback timing indicator field is used to indicate the offset (K1) from a slot in which the last OFDM symbol of a PDSCH scheduled by the DCI format 1_0 is included to another slot in which the first OFDM symbol of a PUCCH triggered by the DCI format 1_0 is included.

The PUCCH resource indicator field is a field indicating an index of any one or more PUCCH resources included in the PUCCH resource set for a PUCCH transmission. The PUCCH resource set comprises of one or more PUCCH resources.

The DCI format 1_0 does not include the carrier indicator field. A downlink component carrier on which a PDSCH scheduled by the DCI format 1_0 is arranged is the same as a downlink component carrier on which a PDCCH including the DCI format 1_0 is arranged.

The DCI format 1_0 does not include the BWP field. A downlink BWP on which a PDSCH scheduled by a DCI format 1_0 is arranged is the same as a downlink BWP on which a PDCCH including the DCI format 1_0 is arranged.

The DCI format 1_1 is used for scheduling of a PDSCH for a cell (or arranged on a cell). The DCI format 1_1 includes a part or all of fields 4A to 4H. The 4A is a DCI format identification field. The 4B is a frequency domain resource assignment field. The 4C is a time domain resource assignment field. The 4D is an MCS field. The 4E is a PDSCH-to-HARQ-feedback indicator field. The 4F is a PUCCH resource indicator field. The 4G is a BWP field. The 4H is a carrier indicator field.

The DCI format identification field included in the DCI format 1_1 indicates 1 (or indicates that the DCI format 1_1 is a downlink DCI format).

The frequency domain resource assignment field included in the DCI format 1_1 is used to indicate the assignment of frequency resources for a PDSCH scheduled by the DCI format 1_1.

The time domain resource assignment field included in the DCI format 1_1 is used to indicate the assignment of time resources for a PDSCH scheduled by the DCI format 1_1.

The MCS field included in DCI format 1_1 is used to indicate a modulation scheme for a PDSCH scheduled by the DCI format 1_1 and/or a part or all of a target coding rate for the PDSCH.

When the DCI format 1_1 includes a PDSCH-to-HARQ-feedback timing indicator field, the PDSCH-to-HARQ-feedback timing indicator field indicates an offset (K1) from a slot including the last OFDM symbol of a PDSCH scheduled by the DCI format 1_1 to another slot including the first OFDM symbol of a PUCCH triggered by the DCI format 1_1.

When the DCI format 1_1 includes the BWP field, the BWP is used to indicate a downlink BWP on which a PDSCH scheduled by the DCI format 1_1 is arranged. When the DCI format 1_1 does not include the BWP field, a downlink BWP on which a PDSCH scheduled by a DCI format 1_1 is arranged is the same as a downlink BWP on which a PDCCH including the DCI format 1_1 is arranged.

If the DCI format 1_1 includes the carrier indicator field, the carrier indicator field is used to indicate a downlink component carrier (or a serving cell) on which a PDSCH is arranged. When the DCI format 1_1 does not include the carrier indicator field, a downlink component carrier (or a serving cell) on which a PDSCH is arranged is the same as a downlink component carrier (or a serving cell) on which a PDCCH including the DCI format 1_1 used for scheduling of the PDSCH is arranged.

A PDSCH is used to transmit one or more transport blocks. The base station device 3 transmits a PDSCH. The terminal device 1 receives the PDSCH.

Downlink physical signals corresponds to a set of resource elements. The downlink physical signals may not carry the information generated in the higher-layer. A downlink physical signal is transmitted by the base station device 3. The downlink physical signal is received by the terminal device 1. In the wireless communication system according to one aspect of an example embodiment and mode, a part or all of an SS (Synchronization signal), DL DMRS (DownLink DeModulation Reference Signal), CSI-RS (Channel State Information-Reference Signal), and DL PTRS (DownLink Phase Tracking Reference Signal) may be used.

The synchronization signal is used for terminal device 1 to synchronize in the frequency domain and/or time domain for downlink. The synchronization signal is a generic name of PSS (Primary Synchronization Signal) and SSS (Secondary Synchronization Signal).

Figure 8:
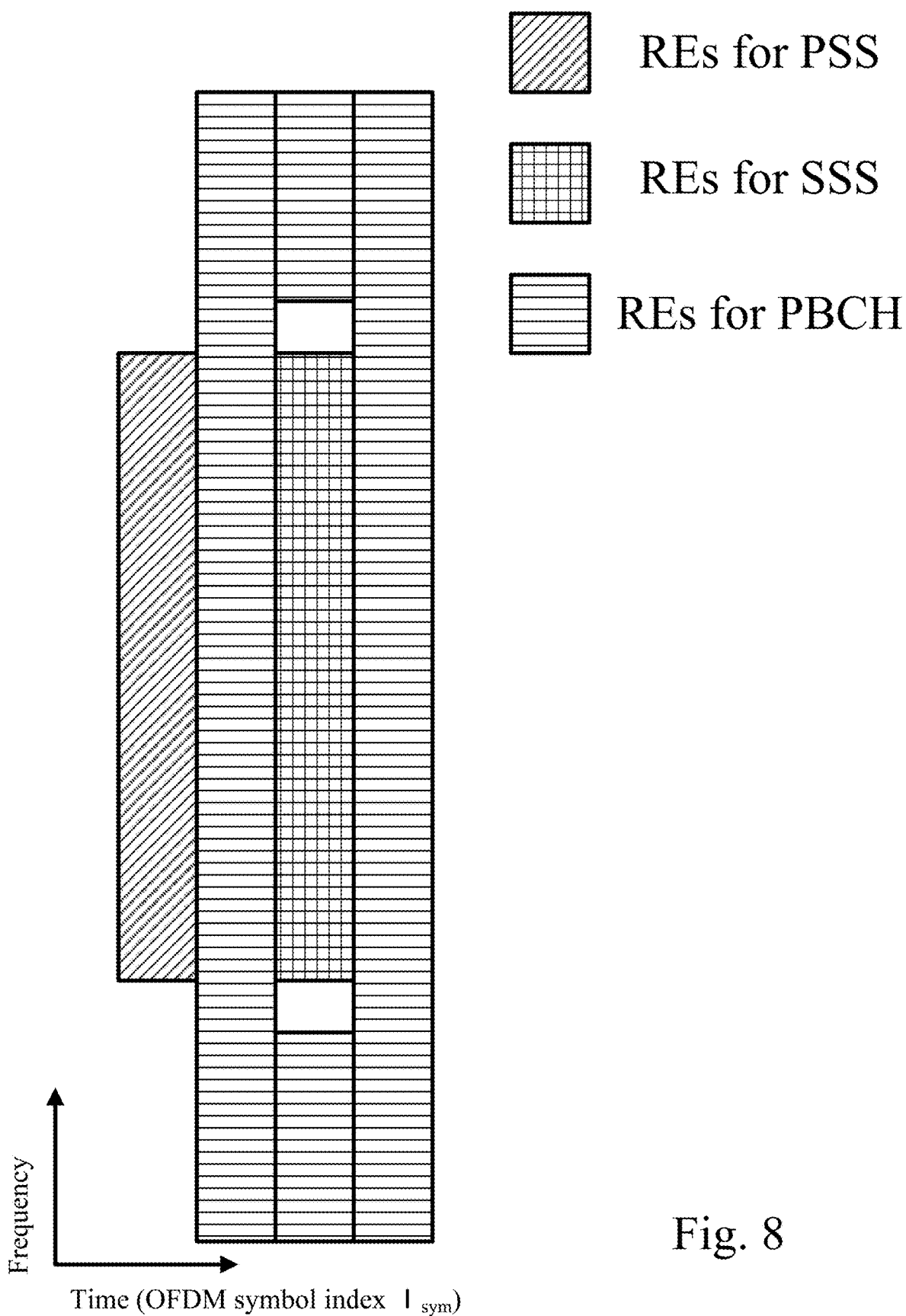
FIG. 8 is a diagrammatic view showing a configuration example of an SS/PBCH block according to an aspect of an example embodiment and mode.

FIG. 8 is a diagram showing a configuration example of an SS/PBCH block according to an aspect of an example embodiment and mode. In FIG. 8, the horizontal axis indicates time domain (OFDM symbol index $l_{sym}$), and the vertical axis indicates frequency domain. The shaded blocks indicate a set of resource elements for a PSS. The blocks of grid lines indicate a set of resource elements for an SSS. Also, the blocks in the horizontal line indicate a set of resource elements for a PBCH and a set of resource elements for a DMRS for the PBCH (DMRS related to the PBCH, DMRS included in the PBCH, DMRS which corresponds to the PBCH).

As shown in FIG. 8, the SS/PBCH block includes a PSS, an SSS, and a PBCH. The SS/PBCH block includes 4 consecutive OFDM symbols. The SS/PBCH block includes 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of a PSS, an SSS, a PBCH, and a DMRS for the PBCH in an SS/PBCH block is identical.

For the DM-RS for the PBCH, the channel over which a symbol for the PBCH on an antenna port is conveyed can be inferred from the channel over which another symbol for the DM-RS on the antenna port is conveyed only if the two symbols are within a SS/PBCH block transmitted within the same slot, and with the same SS/PBCH block index.

DL DMRS is a generic name of DMRS for a PBCH, DMRS for a PDSCH, and DMRS for a PDCCH.

A set of antenna ports for a DMRS for a PDSCH (a DMRS associated with a PDSCH, a DMRS included in a PDSCH, a DMRS which corresponds to a PDSCH) is given based on the set of antenna ports for the PDSCH. For example, the set of antenna ports for the DMRS for the PDSCH may be the same as the set of antenna ports for the PDSCH.

Transmission of a PDSCH and transmission of a DMRS for the PDSCH is indicated by one DCI format. The PDSCH and the DMRS for the PDSCH is collectively referred to as PDSCH.

For a DM-RS associated with a PDSCH, the channel over which a symbol for the PDSCH on one antenna port is conveyed can be inferred from the channel over which another symbol for the DM-RS on the antenna port is conveyed only if the two symbols are within the same resource as the scheduled PDSCH, in the same slot, and in the same PRG (Precoding Resource Group).

Antenna ports for a DMRS for a PDCCH (a DMRS associated with a PDCCH, a DMRS included in a PDCCH, a DMRS which corresponds to a PDCCH) is the same as an antenna port for the PDCCH.

For a DM-RS associated with a PDCCH, the channel over which a symbol for the PDCCH on one antenna port is conveyed can be inferred from the channel over which another symbol for the DM-RS on the same antenna port is conveyed only if the two symbols are within resources for which the UE may assume the same precoding being used (i.e. within resources in a REG bundle).

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channel used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords, and modulation processing is performed for each codeword.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH is used to transmit a common RRC message in a plurality of terminal devices 1. The CCCH is used for terminal device 1 that is not in RRC-connected mode. The DCCH is used to transmit a dedicated RRC message to the terminal device 1. The DCCH is used for the terminal device 1 that is in RRC-connected mode.

The RRC message includes one or more RRC parameters. For example, the RRC message may include a MIB. For example, the RRC message may include system information (SIB: System Information Block, MIB). SIB is a generic name for various type of SIBs (e.g., SIB1, SIB2). For example, the RRC message may include a message which corresponds to a CCCH. For example, the RRC message may include a message which corresponds to a DCCH. RRC message is a general term for common RRC message and dedicated RRC message.

The BCCH in the logical channel is mapped to the BCH or the DL-SCH in the transport channel. The CCCH in the logical channel is mapped to the DL-SCH or the UL-SCH in the transport channel. The DCCH in the logical channel is mapped to the DL-SCH or the UL-SCH in the transport channel.

The UL-SCH in the transport channel is mapped to a PUSCH in the physical channel. The DL-SCH in the transport channel is mapped to a PDSCH in the physical channel. The BCH in the transport channel is mapped to a PBCH in the physical channel.

A higher-layer parameter is a parameter included in an RRC message or a MAC CE (Medium Access Control Control Element). The higher-layer parameter is a generic name of information included in a MIB, system information, a message which corresponds to CCCH, a message which corresponds to DCCH, an RRC parameter, and a MAC CE.

A higher-layer parameter may be a cell-specific parameter or a UE-specific parameter. A cell-specific parameter is a parameter including a common configuration in a cell. A UE-specific parameter is a parameter including a configuration that may be configured differently for each UE.

The base station device 3 may indicate change of cell-specific parameters by reconfiguration with random-access. The UE may change cell-specific parameters before triggering random-access. The base station device may indicate change of UE-specific parameters by reconfiguration with or without random-access. The UE may change UE-specific parameters before or after random-access.

The procedure performed by terminal device 1 includes a part or all of the following 5A to 5C. The 5A is cell search. The 5B is random-access. The 5C is data communication.

The cell search is a procedure used by the terminal device 1 to synchronize with a cell in the time domain and/or the frequency domain and to detect a physical cell identity. Terminal device 1 tries to detect the physical cell ID by performing synchronization of time domain and/or frequency domain with a cell by the cell search.

A sequence of a PSS is given based on a physical cell ID. A sequence of an SSS is given based on the physical cell ID.

An SS/PBCH block candidate indicates a resource for which transmission of the SS/PBCH block may exist. An SS/PBCH block is transmitted at a resource indicated as the SS/PBCH block candidate. The base station device 3 transmits an SS/PBCH block at an SS/PBCH block candidate. The terminal device 1 receives the SS/PBCH block at the SS/PBCH block candidate.

The base station device 3 transmits SS/PBCH blocks of one or more indexes at a predetermined cycle. The terminal device 1 tries to decode the PBCH included in the SS/PBCH block.

The random-access is a procedure including a part or all of message 1, message 2, message 3, and message 4.

The message 1 is a procedure in which the terminal device 1 transmits a PRACH. The terminal device 1 transmits the PRACH in one PRACH occasion selected from among one or more PRACH occasions based on the index of the SS/PBCH block candidate detected based on the cell search.

The message 2 is a procedure in which the terminal device 1 attempts to detect a DCI format 1_0 with CRC (Cyclic Redundancy Check) scrambled by an RA-RNTI (Random Access-Radio Network Temporary Identifier).

The message 3 is a procedure for transmitting a PUSCH scheduled by a random-access response grant included in a random access response scheduled by the DCI format 1_0 detected in the message 2 procedure.

The PUSCH scheduled based on the random-access response grant is either a message 3 PUSCH or a PUSCH. The message 3 PUSCH contains a contention resolution identifier MAC CE. The contention resolution ID MAC CE includes a contention resolution ID.

Retransmission of the message 3 PUSCH is scheduled by DCI format 0_0 with CRC scrambled by a TC-RNTI (Temporary Cell-Radio Network Temporary Identifier).

The message 4 is a procedure that attempts to detect a DCI format 1_0 with CRC scrambled by either a C-RNTI (Cell-Radio Network Temporary Identifier) or a TC-RNTI. The terminal device 1 receives a PDSCH scheduled based on the DCI format 1_0. The PDSCH may include a collision resolution ID.

Data communication is a generic term for downlink communication and uplink communication.

In data communication, the terminal device 1 attempts to detect a PDCCH (attempts to monitor a PDCCH, monitors a PDCCH, detect a DCI format, attempts to monitor a DCI format, monitors a DCI format) in a resource identified based on a control resource set and a search-space-set. It's also called as "the terminal device 1 attempts to detect a PDCCH in a control resource set", "the terminal device 1 attempts to detect a PDCCH in a search-space-set", "the terminal device 1 attempts to detect a PDCCH candidate in a control resource set", "the terminal device 1 attempts to detect a PDCCH candidate in a search-space-set", "the terminal device 1 attempts to detect a DCI format in a control resource set", or "the terminal device 1 attempts to detect a DCI format in a search-space-set". Monitoring a PDCCH may be equivalent as monitoring a DCI format in the PDCCH.

The control resource set is a set of resources identified by a set of resource blocks and a set of OFDM symbols in a slot.

The set of resources for the control resource set may be indicated by higher-layer parameters. The number of OFDM symbols included in the control resource set may be indicated by higher-layer parameters.

A PDCCH may be also called as a PDCCH candidate.

A search-space-set is defined as a set of PDCCH candidates. A search-space-set may be a Common Search Space (CSS) set or a UE-specific Search Space (USS) set.

The CSS set is a generic name of a type-0 PDCCH common search-space-set, a type-0a PDCCH common search-space-set, a type-1 PDCCH common search-space-set, a type-2 PDCCH common search-space-set, and a type-3 PDCCH common search-space-set. The USS set may be also called as UE-specific PDCCH search-space-set.

The type-0 PDCCH common search-space-set may be used as a common search-space-set with index 0. The type-0 PDCCH common search-space-set may be a common search-space-set with index 0.

A search-space-set is associated with (included in, corresponding to) a control resource set. The index of the control resource set associated with the search-space-set may be indicated by higher-layer parameters.

For a search-space-set, a part or all of 6A to 6C may be indicated at least by higher-layer parameters. The 6A is PDCCH monitoring period. The 6B is PDCCH monitoring pattern within a slot. The 6C is PDCCH monitoring offset.

A monitoring occasion of a search-space-set may correspond to one or more OFDM symbols in which the first OFDM symbol of the control resource set associated with the search-space-set is allocated. A monitoring occasion of a search-space-set may correspond to resources identified by the first OFDM symbol of the control resource set associated with the search-space-set. A monitoring occasion of a search-space-set is given based on a part or all of PDCCH monitoring periodicity, PDCCH monitoring pattern within a slot, and PDCCH monitoring offset.

Figure 9:
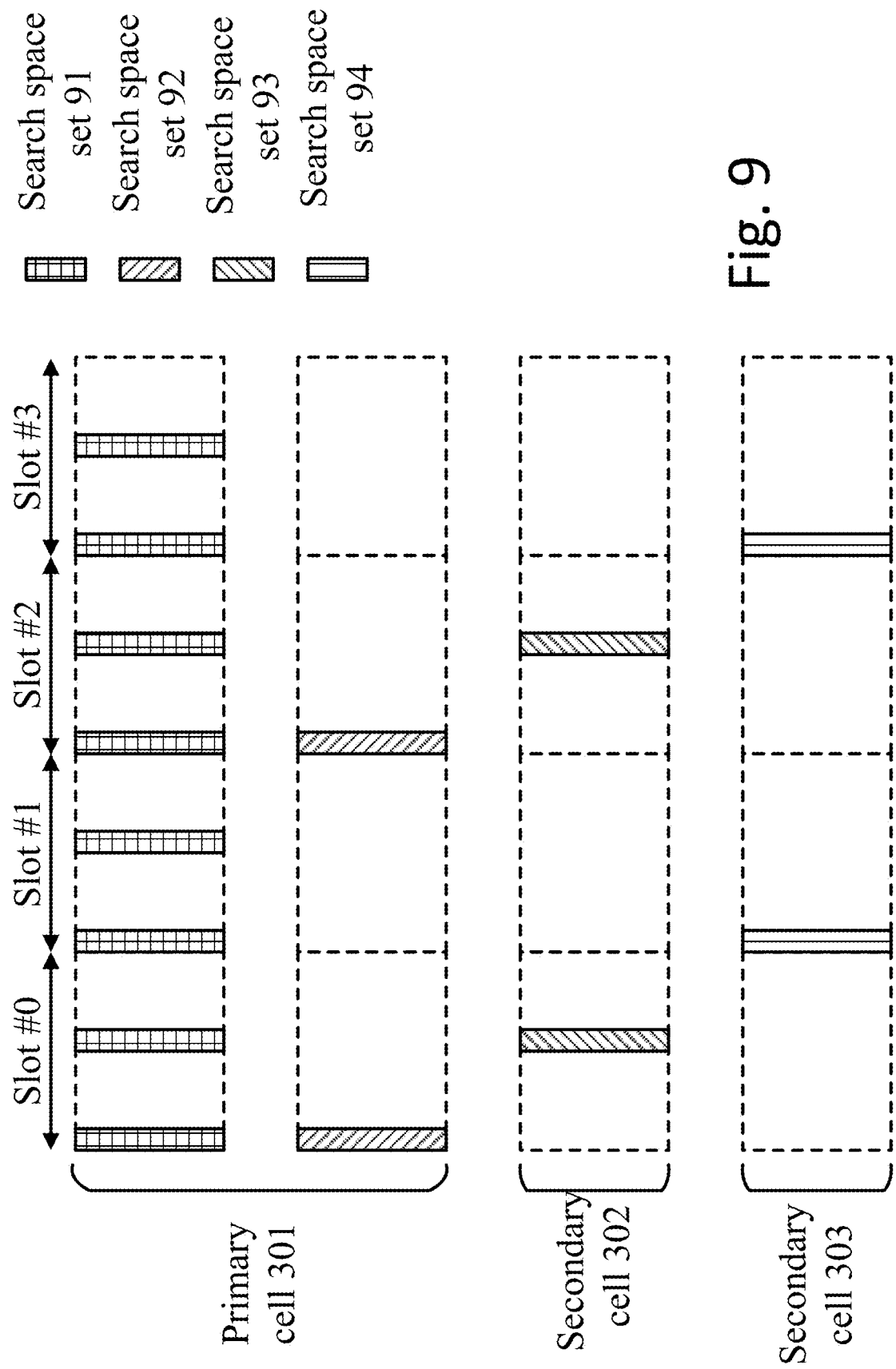
FIG. 9 is a diagrammatic view showing an example of the monitoring occasion of search-space-sets according to an aspect of an example embodiment and mode.

FIG. 9 is a diagram showing an example of the monitoring occasion of search-space-sets according to an aspect of an example embodiment and mode. In FIG. 9, the search-space-set 91 and the search-space-set 92 are configured in the primary cell 301, the search-space-set 93 is configured in the secondary cell 302, and the search-space-set 94 is configured in the secondary cell 303.

In FIG. 9, the block indicated by the grid line indicates the search-space-set 91, the block indicated by the upper right diagonal line indicates the search-space-set 92, the block indicated by the upper left diagonal line indicates the search-space-set 93, and the block indicated by the horizontal line indicates the search-space-set 94.

In FIG. 9, the PDCCH monitoring periodicity for the search-space-set 91 is set to 1 slot, the PDCCH monitoring offset for the search-space-set 91 is set to 0 slot, and the PDCCH monitoring pattern for the search-space-set 91 is [1, 0, 0, 0, 0, 0, 0, 1, 0, 0, 0, 0, 0, 0]. That is, the monitoring occasion of the search-space-set 91 corresponds to the first OFDM symbol (OFDM symbol #0) and the eighth OFDM symbol (OFDM symbol #7) in each of the slots.

In FIG. 9, the PDCCH monitoring periodicity for the search-space-set 92 is set to 2 slots, the PDCCH monitoring offset for the search-space-set 92 is set to 0 slots, and the PDCCH monitoring pattern for the search-space-set 92 is [1, 0, 0, 0, 0, 0, 0, 0, 0, 0, 0, 0, 0, 0]. That is, the monitoring occasion of the search-space-set 92 corresponds to the leading OFDM symbol (OFDM symbol #0) in each of the even slots.

In FIG. 9, the PDCCH monitoring periodicity for the search-space-set 93 is set to 2 slots, the PDCCH monitoring offset for the search-space-set 93 is set to 0 slots, and the PDCCH monitoring pattern for the search-space-set 93 is [0, 0, 0, 0, 0, 0, 0, 1, 0, 0, 0, 0, 0, 0]. That is, the monitoring occasion of the search-space-set 93 corresponds to the eighth OFDM symbol (OFDM symbol #8) in each of the even slots.

In FIG. 9, the PDCCH monitoring periodicity for the search-space-set 94 is set to 2 slots, the PDCCH monitoring offset for the search-space-set 94 is set to 1 slot, and the PDCCH monitoring pattern for the search-space-set 94 is [1, 0, 0, 0, 0, 0, 0, 0, 0, 0, 0, 0, 0, 0]. That is, the monitoring occasion of the search-space-set 94 corresponds to the leading OFDM symbol (OFDM symbol #0) in each of the odd slots.

The type-0 PDCCH common search-space-set may be used for a DCI format with a cyclic redundancy check (CRC) sequence scrambled by an SI-RNTI (System Information-Radio Network Temporary Identifier).

The type-0a PDCCH common search-space-set may be used for a DCI format with a cyclic redundancy check sequence scrambled by an SI-RNTI.

The type-1 PDCCH common search-space-set may be used for a DCI format with a CRC sequence scrambled by an RA-RNTI (Random Access-Radio Network Temporary Identifier) or a CRC sequence scrambled by a TC-RNTI (Temporary Cell-Radio Network Temporary Identifier).

The type-2 PDCCH common search-space-set may be used for a DCI format with a CRC sequence scrambled by P-RNTI (Paging-Radio Network Temporary Identifier).

The type-3 PDCCH common search-space-set may be used for a DCI format with a CRC sequence scrambled by a C-RNTI (Cell-Radio Network Temporary Identifier).

The UE-specific search-space-set may be used for a DCI format with a CRC sequence scrambled by a C-RNTI.

In downlink communication, the terminal device 1 may detect a downlink DCI format. The detected downlink DCI format is used for resource assignment for a PDSCH. The detected downlink DCI format is also referred to as downlink assignment. The terminal device 1 attempts to receive the PDSCH. Based on a PUCCH resource indicated based on the detected downlink DCI format, an HARQ-ACK corresponding to the PDSCH (HARQ-ACK corresponding to a transport block included in the PDSCH) may be reported to the base station device 3.

In uplink communication, the terminal device 1 may detect an uplink DCI format. The detected uplink DCI format is used for resource assignment for a PUSCH. The detected uplink DCI format is also referred to as uplink grant. The terminal device 1 transmits the PUSCH.

Figure 10:
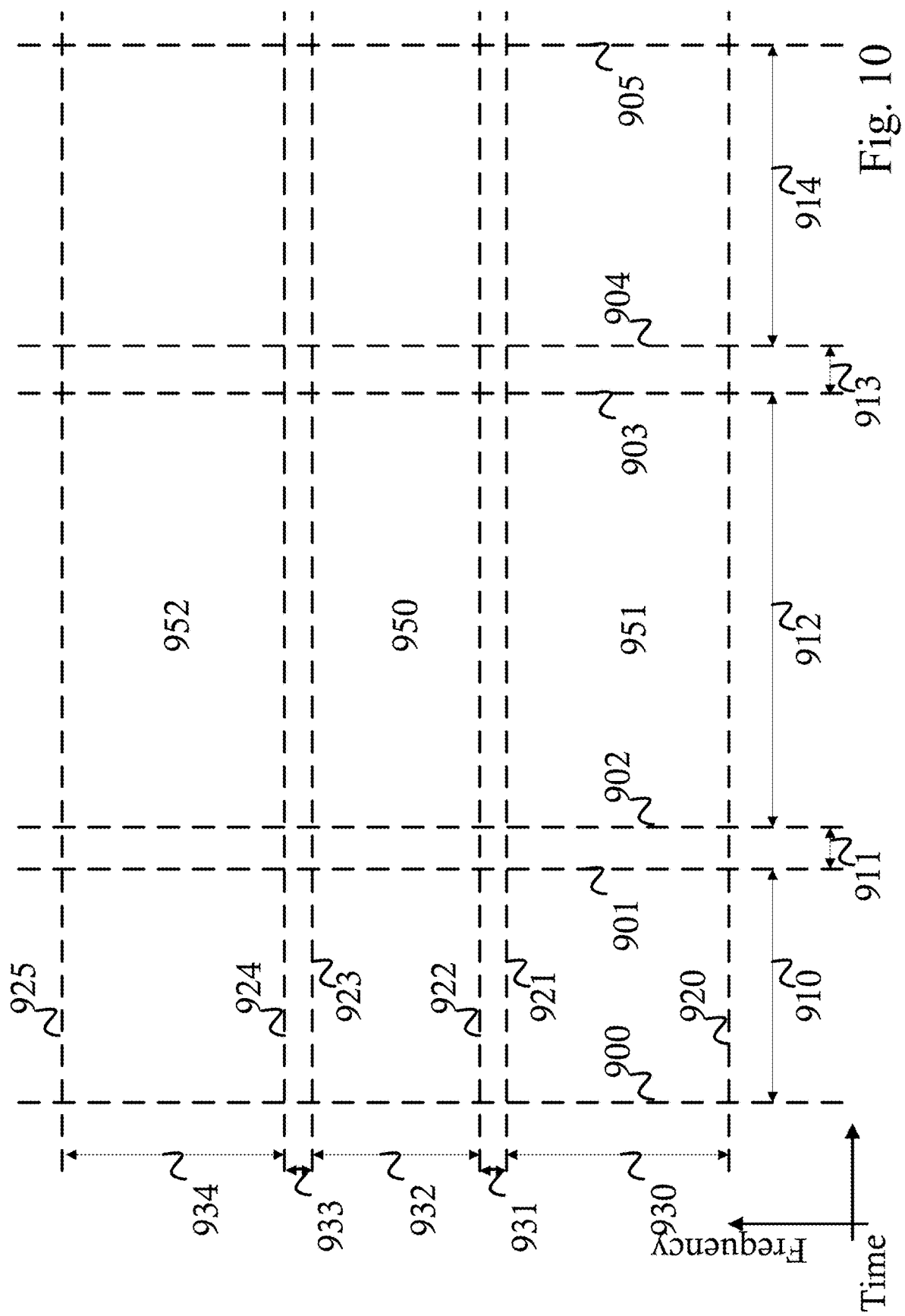
FIG. 10 is a diagrammatic view showing an example configuration of time-frequency subband grid for SBFD operation.

FIG. 10 shows an example configuration of time-frequency subband grid for SBFD operation. In FIGS. 10, 900, 901, 902, 903, 904, and 905 represent respective points in time domain. 910, 911, 912, 913, and 914 represent respective time duration in time domain. 920, 921, 922, 923, 924, and 925 represent respective points in frequency domain. 930, 931, 932, 933, and 934 represent respective bandwidth in frequency domain.

In the example shown in FIG. 10, it is assumed that the duration 910 represents DL region, the duration 913 represents Flexible region, and the duration 914 represents UL region. DL region, flexible region, and UL region is configured by a common RRC parameter for TDD pattern, referred to as common TDD parameter. Also, it is assumed that the duration from 900 to 905 as period of the TDD pattern configured by the common TDD parameter.

There are 2 examples for configuration details of the duration 911 and 912. One example (Example #1) is that the durations 911 and 912 are DL region configured by the common TDD parameter. Another example (Example #2) is that the durations 911 and 912 are flexible region configured by the common TDD parameter.

In the example shown in FIG. 10, it is assumed that the bandwidths 930 and 934 represent respective bandwidths of DL subbands 951 and 952, the bandwidth 932 represents bandwidth of UL subband 950, and the bandwidths 931 and 933 represent respective bandwidths of guard bands.

In the example shown in FIG. 10, it is assumed that the terminal device 1 recognizes the region identified by the duration 912 and the bandwidth 932 as the UL subband 950, recognizes the region identified by the duration 912 and the bandwidth 930 as the DL subband 951, and recognizes the region identified by the duration 912 and the bandwidth 934 as the DL subband 952.

In the example shown in FIG. 10, it is possible that length of the duration 911 is 0 or more, and the length of the duration 913 is 0 or more.

In the example shown in FIG. 10, it is possible that width of the bandwidth 931 is 0 or more, and width of the bandwidth 933 is 0 or more.

In example #2, the terminal device 1 may be further configured to monitor DCI format 2_0. The DCI format 20 comprises of an information field which indicates a usage type of the flexible region. For example, there are "downlink", "flexible", and "uplink" usage types.

FIG. 11 shows an example configuration of a DCI format 2_0. In FIG. 11, the horizontal axis represents bit space of a DCI format 2_0. DCI format 2_0 has N SFT fields and a CRC sequence. Each SFI field is used to indicate a slot format indicator for a UE. The CRC sequence is scrambled by SFI-RNTI.

To monitor DCI format 2_0, the UE is provided a RRC parameter which indicates payload size of DCI format 2_0. The payload represents the number of bits in a DCI format 2_0 to be monitored excluding the number of bits in the CRC sequence. In other expressions, the payload size represents the number of bits of N SFI fields.

To derive a slot format indicator, the UE is provided a RRC parameter which indicates starting bit location of a SFI field to be applied to the UE. Further, to derive a slot format indicator, the UE is provided with one or more RRC parameters which is used to determine the number of bits of the SFI field to be applied to the UE. Each of the one or more RRC parameters is an index for a slot format combination. Each slot format combination is provided an index. The UE determines the largest index in the one or more RRC parameters. The UE determines the number of bits of the SFI field by the determined largest index. For example, the UE determines the number of bits of the SFI field by max(ceil (log$_2$(maxSFIindex+1)),1) where the maxSFIindex is the value of the determined largest index, max(A,B) represents operation to obtain the maximum of A and B.

A slot format combination comprises one or more slot formats. Each slot format comprises transmission direction configuration for each symbol in a slot. For example, a slot format represents "DDDDDDFFUUUUUU" where each capital letter indicates transmission direction for a OFDM symbol in a slot. Here, 'D' represents that the corresponding OFDM symbol in a slot is downlink symbol, 'F' represents that the corresponding OFDM symbol in a slot is flexible symbol, and 'U' represents that the corresponding OFDM symbol in a slot is uplink symbol. In another example, a slot format represents "DDDDDDDDDDFFUU". In another example, a slot format represents downlink symbol for all OFDM symbols in a slot. In another example, a slot format represents flexible symbol for all OFDM symbols in a slot. In another example, a slot format represents uplink symbol for all OFDM symbols in a slot. In another example, a slot format represents special information that instructs UE to assume that the UE has not been configured with monitoring of DCI format 2_0.

In a case that a DCI format 2_0 has been detected in slot with index n, one or more slot formats in a slot format combination identified by the DCI format 20 is applied to the number of slots starting at the slot with index n. For example, the first slot format in the one or more slot formats is applied to the slot with index n. Further, the second slot format in the one or more slot formats is applied to the slot with index n+1. Further, the xth slot format in the one or more slot formats is applied to the slot with index n+x−1.

Returning to FIG. 7, the wireless terminal or terminal device 1 according to example embodiment and mode described herein communicates across a radio interface with a radio access network and comprises receiver circuitry 11b and processor circuitry 19. The receiver circuitry 11b is configured to receive from the radio access network: (1) slot format information comprising transmission direction configuration for each symbol in a slot for an uplink (UL) subband, and (2) validation information. The processor circuitry (19), which may include the validation controller 18, is configured to use the validation information to perform validation or invalidation of the transmission direction configuration for at least a portion of the UL subband. Examples of the validation information are provided below.

In dynamic TDD operation with DCI format 2_0, it is good to make validation/invalidation of the UL subband 950 by the DCI format 2_0 to exploit dynamic TDD benefit. The UE, which is another name for the wireless terminal or wireless device, may assume that the UL subband 950 is invalidated in a case that the UE does not validate the UL subband 950.

Figure 12:
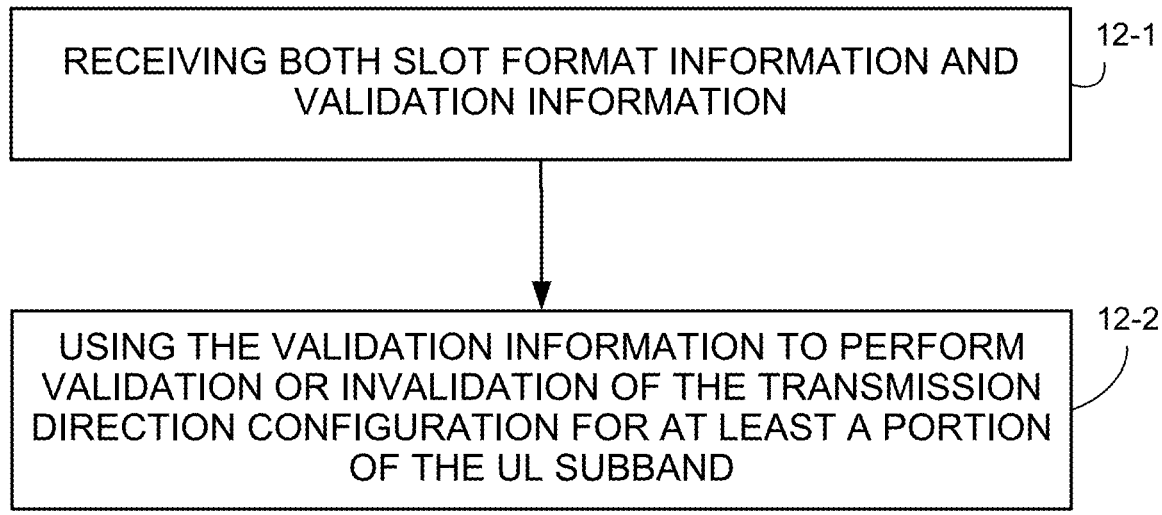
FIG. 12 is a flowchart showing example, representative acts or steps performed by the wireless terminal of FIG. 6.

Example acts or steps performed by the wireless terminal or terminal device 1 of an example embodiment and mode are illustrated in FIG. 12. Act 12-1 comprises the wireless terminal 1 receiving from the radio access network, e.g., from base station or access node 3, both slot format information, which may comprise transmission direction configuration for each symbol in a slot for an uplink (UL) subband, and validation information. Act 12-2 comprises using the validation information to perform validation or invalidation of the transmission direction configuration for at least a portion of the UL subband.

Returning to FIG. 5, the base station or access node 3 according to example embodiment and mode described herein communicates with a wireless terminal 1 over a radio interface and comprises transmitter circuitry 30a and receiver circuitry 30b. The transmitter circuitry 30a is configured to transmit to the wireless terminal both slot format information comprising transmission direction configuration for each symbol in a slot for an uplink (UL) subband and validation information. The receiver circuitry 30b is configured to receive from the wireless terminal information transmitted in symbols of the uplink subband according to the validation information.

Figure 13:
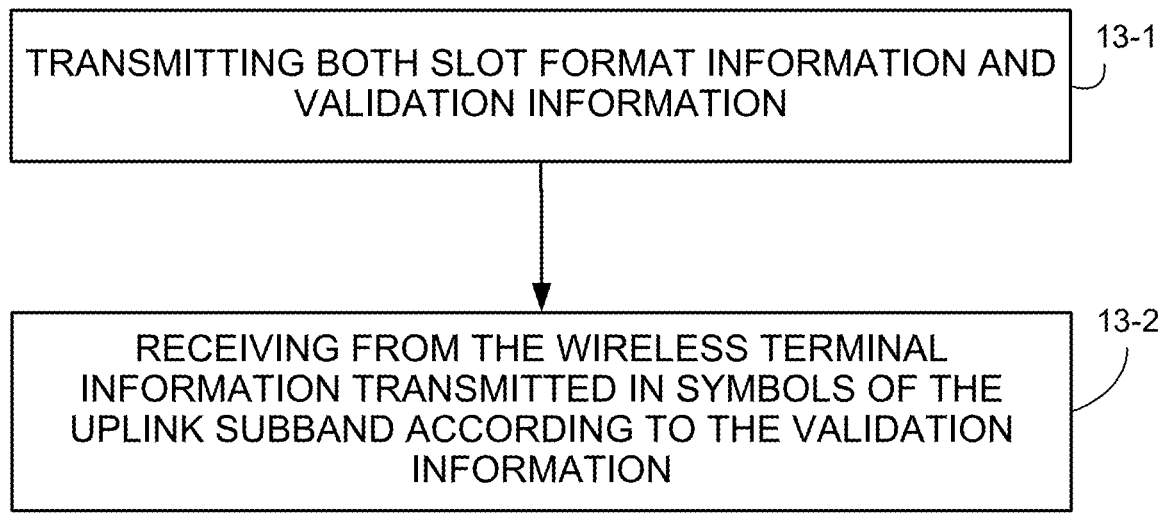
FIG. 13 is a flowchart showing example, representative acts or steps performed by the base station or access node of FIG. 5.

Example acts or steps performed by the base station or access node 3 according to example embodiment and mode described herein are illustrated in FIG. 13. Act 13-1 comprises the base station 3 transmitting to the wireless terminal both slot format information, which may comprise transmission direction configuration for each symbol in a slot for an uplink (UL) subband, and validation information. Act 13-2 comprises receiving from the wireless terminal information transmitted in symbols of the uplink subband according to the validation information.

VALIDATION INFORMATION EXAMPLES

For some examples of the validation information, the validation information may be obtained from a downlink control information format which comprises one or more information fields for providing slot format information. The downlink control information, DCI, may be information carried in a DCI format message transmitted from the base station 3 to the wireless terminal 1. The fields of the downlink control information may be arranged or organized according to one of several format types, including those listed and described above. For this particular example of validation information, the slot format information may be in DCI format types other than DCI Format 0_0, DCI Format 0_1, DCI Format 1_0, and DCI Format 1_1. For example, the validation information may be carried in downlink control information having format type DCI_Format_2_0.

In one example of the validation information, as illustrated by way of non-limiting example in FIG. 14, the DCI format may comprise an integer N number of slot format indication (SFI) fields and a cyclic redundancy check (CRC). In this example of expression of the validation information, the validation information comprises an additional field of the DCI format.

For example, DCI format 2_0 may additionally include 1 bit field whether to validate the UL subband 950 or not. For example, in a case that the 1 bit field indicates 1, the UE may validate the UL subband 950 in symbols which is applied a slot format determined by the DCI format 2_0. For example, in a case that the 1 bit field indicates 0, the UE may not validate the UL subband 950 in symbols which is applied a slot format determined by the DCI format 2_0.

For example, the 1 bit field may be used to determine whether to validate the UL subband 950 in downlink symbols determined by the DCI format 2_0. For example, in a case that the 1 bit field indicates 1, the UE may validate the UL subband 950 in downlink symbols determined by the DCI format 2_0. For example, in a case that the 1 bit field indicates 0, the UE may not validate the UL subband 950 in downlink symbols determined by the DCI format 2_0.

For example, the 1 bit field may be used to determine whether to validate the UL subband 950 in flexible symbols determined by the DCI format 2_0. For example, in a case that the 1 bit field indicates 1, the UE may validate the UL subband 950 in flexible symbols determined by the DCI format 2_0. For example, in a case that the 1 bit field indicates 0, the UE may not validate the UL subband 950 in flexible symbols determined by the DCI format 2_0.

For example, the UE may not validate the UL subband 950 in uplink symbols determined by the DCI format 2_0 regardless of the value of the 1 bit field.

Thus, as described above and herein, the validation information is used to perform validation or invalidation of the transmission direction configuration for at least one of the following validation UL subband targets: (1) all of the UL subband; (2) symbols of the uplink subband for which the slot format indicates a downlink direction; (3) symbols of the uplink subband for which the slot format indicates an uplink direction; and (4) symbols of the uplink subband for which the slot format indicates flexible direction. To which of the validation UL subband targets the validation information applies, i.e., which of target (1)-(4) is involved, may be communicated to wireless terminal 1 in an RRC parameter or RRC message transmitted from the radio control network, i.e., from the base station 3.

As another example of validation information, a new DCI format may be introduced. For example, the UE may be provided a RRC parameter which indicates payload size of the new DCI format. The new DCI format comprises of one or more SFI fields, CRC sequence, and 1-bit field indicating whether to validate the UL subband 950 or not. For example, the SFI fields may be used to identify a slot format combination from the one or more slot format combinations provided for DCI format 2_0. For example, the SFI fields may be used to identify a slot format combination from the one or more slot format combinations provided for the new DCI format. For example, in a case that the 1 bit field indicates 1, the UE may validate the UL subband 950 in symbols which is applied a slot format determined by the new DCI format. For example, in a case that the 1 bit field indicates 0, the UE may not validate the UL subband 950 in symbols which is applied a slot format determined by the new DCI format.

For example, the 1 bit field may be used to determine whether to validate the UL subband 950 in downlink symbols determined by the new DCI format. For example, in a case that the 1 bit field indicates 1, the UE may validate the UL subband 950 in downlink symbols determined by the new DCI format. For example, in a case that the 1 bit field indicates 0, the UE may not validate the UL subband 950 in downlink symbols determined by the new DCI format.

For example, the 1 bit field may be used to determine whether to validate the UL subband 950 in flexible symbols determined by the new DCI format. For example, in a case that the 1 bit field indicates 1, the UE may validate the UL subband 950 in flexible symbols determined by the new DCI format. For example, in a case that the 1 bit field indicates 0, the UE may not validate the UL subband 950 in flexible symbols determined by the new DCI format.

For example, the UE may not validate the UL subband 950 in uplink symbols determined by the new DCI format regardless of the value of the 1 bit field.

As another example, illustrated by way of non-limiting example in FIG. 15, the DCI format may comprise an integer N number of slot format indication (SFI) fields and a cyclic redundancy check (CRC) information, and wherein the validation information comprises a radio network temporary identifier (RNTI) used to scramble the CRC information. For example, a new DCI format may be introduced. For example, the UE may be provided with an RRC parameter which indicates payload size of the new DCI format. The new DCI format comprises of one or more SFI fields and CRC information. For example, the SFI fields may be used to identify a slot format combination from the one or more slot format combinations provided for DCI format 2_0. For example, the SFI fields may be used to identify a slot format combination from the one or more slot format combinations provided for the new DCI format. For the new DCI format, different RNTI from RNTI for the DCI format 2_0 is configured. For example, validation/invalidation of the UL subband may be done via DCI format type. For example, in a case that new DCI format has been detected, the UE may validate the UL subband 950 in symbols which is applied a slot format determined by the new DCI format. For example, in a case that DCI format 2_0 has been detected, the UE may not validate the UL subband 950 in symbols which is applied a slot format determined by the DCI format 2_0.

For example, the DCI format type may be used to determine whether to validate the UL subband 950 in downlink symbols determined by the new DCI format or the DCI format 2_0. For example, in a case that the new DCI format has been detected, the UE may validate the UL subband 950 in downlink symbols determined by the new DCI format. For example, in a case that the DCI format 2_0 has been detected, the UE may not validate the UL subband 950 in downlink symbols determined by the DCI format 2_0.

For example, the DCI format type may be used to determine whether to validate the UL subband 950 in flexible symbols determined by the new DCI format or the DCI format 2_0. For example, in a case that the new DCI format has been detected, the UE may validate the UL subband 950 in flexible symbols determined by the new DCI format. For example, in a case that the DCI format 2_0 has been detected, the UE may not validate the UL subband 950 in flexible symbols determined by the DCI format 2_0.

For example, the UE may not validate the UL subband 950 in uplink symbols determined by the new DCI format or the DCI format 20 regardless of the detected DCI format type.

As yet another example of an expression of the validation information, and as illustrated by way of non-limiting example in FIG. 16, an additional field of the slot format information may comprise an X-bit field or bitmap, wherein X is an integer greater than 1 and each bit of the X-bit field/bitmap indicates either validation or invalidation of the UL subband. Each bit of the X-bit field/bitmap is associated with one of the following: (1) a slot of the UL subband; (2) a group of orthogonal frequency division multiplexed (OFDM) symbols of the UL subband; and (3) an OFDM symbol of the UL subband. For example, DCI format 2_0 may additionally include X-bits field whether to validate the UL subband 950 or not. For example, each bit in X-bits is associated with a slot. For example, each bit in X-bits is associated with a group of OFDM symbols. For example, each bit in X-bits is associated with an OFDM symbol. For example, in a case that a bit in the X-bits field indicates 1, the UE may validate the UL subband 950 in symbols associated with the bit. For example, in a case that the bit in the X-bits field indicates 1, the UE may not validate the UL subband 950 in symbols associated with the bit.

As an example of the foregoing, each of the bits in the bitmap may indicate whether SBFD should be used or not to a specific slot. For example, when a cycle of DCI format 2_0 is slots, then we may have a 5 bit bitmap for a slot-level bitmap or a 70 bit bitmap for a symbol-level bitmap, or if the number of slots/symbols configured with UL subbands in a specific duration is 2 slots/28 symbols, a 2 (slot-level)/28 (symbol-level) bit bitmap is used.

An example semi-static TDD configuration for the bitmap may be "DDFFU", which is an example TDD configuration. "DDFFU" means that a TDD pattern comprises of 5 slots. In the TDD pattern, the first 2 slots are downlink, the third and fourth slots are flexible, and the last slot is uplink.

An example SBFD UL subband configuration may be "01100", which indicates that the UL subband configuration is provided based on the TDD configuration periodicity (i.e., 5 slots in which the second and third slots are configured with UL subband, but no UL subband for other slots. In the above example, the bitmap information is only necessary for slots with the UL subband (i.e., the second and third slots). Therefore, the above illustrates a symbol level bitmap for 2 slots (assumes 14 OFDM symbols per slot) of 28 bits. The foregoing is merely one non-exhaustive and non-limiting numeric example.

As yet another example of an expression of the validation information, the DCI format may comprise information which specifies which symbols of a slot the UL subband are validated or invalidated. For example, the format of DCI format comprises information which specifies a symbol of a slot the UL subband as being one of downlink, uplink or flexible.

For example, new slot formats with new transmission direction may be introduced. For example, a new slot format may represent "DDDDSSSSSSFFUU". Here, 'S' represents that the UL subband 950 is validated in the corresponding OFDM symbol. For example, "DDDDSSSSSSFFUU" may represent that the UL subband 950 is validated from 5th OFDM symbol to 10th OFDM symbol in a slot, and the UL subband 950 is not validated from 1st OFDM symbol to 4th OFDM symbol and from 11th OFDM symbol to 14th OFDM symbol.

As yet another example of an expression of the validation information, the validation information may be obtained from the slot format information and particularly from the format type utilized for the slot format information. For example, a DCI format type DCI format 20 specifies one of the following:

(1) the UL subband 950 is validated if indicated as downlink in the DCI format 2_0, not activated otherwise;
(2) the UL subband 950 is validated if indicated as uplink according to the DCI format 2_0; and
(3) the UL subband 950 is validated if indicated as flexible according to the DCI format 2_0.

Moreover, the slot format information may specify validation or invalidation of at least one of the following:
all of the UL subband;
symbols of the uplink subband for which the slot format indicates a downlink direction;
symbols of the uplink subband for which the slot format indicates an uplink direction;
symbols of the uplink subband for which the slot format indicates flexible direction.

For example, the UE may validate/invalidate the UL subband 950 based on transmission direction determined by the DCI format 2_0. For example, the UE may validate the UL subband 950 in downlink symbols determined by the DCI format 2_0. For example, the UE may not validate the UL subband in flexible symbols determined by the DCI format 2_0. For example, the UE may not validate the UL subband in uplink symbols determined by the DCI format 2_0.

For example, the UE may not validate the UL subband 950 in downlink symbols determined by the DCI format 2_0. For example, the UE may validate the UL subband in flexible symbols determined by the DCI format 2_0. For example, the UE may not validate the UL subband in uplink symbols determined by the DCI format 2_0.

For example, the UE may not validate the UL subband 950 in downlink symbols determined by the DCI format 2_0. For example, the UE may not validate the UL subband in flexible symbols determined by the DCI format 2_0. For example, the UE may validate the UL subband in uplink symbols determined by the DCI format 2_0.

Validation/invalidation of the UL subband 950 may have impact on resource allocation in various aspects.

For example, the UL subband 950 has been validated in a symbol, the DL subband 951 and/or 952 may be validated in the symbol.

FIG. 17 shows a resource allocation example for a PDSCH in a time-frequency subband grid. 1201 represents time-frequency resource for a PDSCH. For example, in a case that the UL subband 950 is validated in symbols for the PDSCH, the UE may receive the PDSCH assuming that the PDSCH is not mapped within the UL subband 950. For example, in a case that the UL subband 950 is validated in symbols for the PDSCH, the UE may receive the PDSCH assuming that the PDSCH is not mapped within the bandwidths 931 and 933. For example, in a case that the UL subband 950 is validated in symbols for the PDSCH, the UE may receive the PDSCH assuming that the PDSCH is mapped on DL subbands 951 and/or 952.

The above is explained, at least in part, by the resource allocation procedure including at least two steps. The first step is to determine resource allocation information (e.g., the information indicates time-frequency resource 1201 in FIG. 17). The second step is to determine unavailable resource and exclude the unavailable resource from the resource indicated by the resource allocation information. As an example, in a case that the UL subband 950 has been validated, the UL subband 950 is identified as unavailable resource, and the unavailable resource is excluded from the resource indicated by the resource allocation information. Contrary, in a case that the UL subband 950 has not been validated, the UL subband 950 is not identified as unavailable resource, and the unavailable resource is not excluded from the resource indicated by the resource allocation information, e.g., PDSCH is transmitted in all resource in time-frequency resource 1201).

For example, in a case that the UL subband 950 is not validated in symbols for the PDSCH, the UE may receive the PDSCH regardless of the UL subband 950. For example, in a case that the UL subband 950 is not validated in symbols for the PDSCH, the UE may receive the PDSCH assuming that the PDSCH is mapped on the UL subband 950, the DL subbands 951 and 952, and the bandwidths 931 and 933.

For example, for a PUSCH, the UE may be provided two frequency offset values for frequency hopping. One frequency offset value may be applied in a case that the UL subband 950 is validated in symbols for the PUSCH. The other frequency offset value may be applied in a case that the UL subband 950 is not validated in the symbols.

For example, for a PUCCH, the UE may be provided RRC parameters for two frequency offset values for frequency hopping. One frequency offset value may be applied in a case that the UL subband 950 is validated in symbols for the PUCCH. The other frequency offset value may be applied in a case that the UL subband 950 is not validated in the symbols.

For example, the UE may be provided RRC parameters for two PUCCH resource sets. One PUCCH resource set may be selected in a case that the UL subband 950 is validated. The other PUCCH resource set may be selected in a case that the UL subband 950 is not validated.

The technology disclosed herein encompasses various solutions, including but not limited to those summarized below. In the below, the notation "SBFD is used" means UL subband is validated, and the notation "SBFD is not used" means UL subband is not validated.

Solution 1:
1a: Introduce 1 bit field in DCI format 2_0 to indicate whether SBFD should be used or not.
If 1 bit field indicates '1' in the DCI format 2_0, UL subband is validated, otherwise, UL subband is not validated.
1a': Introduce new DCI format with the same structure as DCI format 2_0.
1 bit field in DCI format 2_0 to indicate whether UL subband is validated or not.
The UE determines whether UL subband is validated or not by RNRI (or DCI format type).
1b: Introduce a bitmap. Each of the bit in the bitmap indicates whether SBFD should be used or not to a specific slot. For example, when a cycle of DCI format 2_0 is 5 slots, then we may have 5 (slot-level) or 70 (symbol-level) bits bitmap, or if the number of slots/symbols configured with UL subbands in a specific duration is 2 slots/28 symbols, 2 (slot-level)/28 (symbol-level) bits bitmap is used.
Semi-static TDD configuration: DDFFU
SBFD UL subband configuration: 01100
The bitmap size: 28 bits 1c: New slot formats are defined with 'D', 'F', 'U', and 'S' ('SBFD'). For example, a slot format is comprised of DDSSSSSSSSFFUU. Slot formats can indicate that each symbol in a slot may be downlink, flexible, uplink, or SBFD.

Solution 2: Whether UL subband is validated or not is determined based on the indicated slot format 2a: UL subband is activated if indicated as "downlink" in DCI format 2_0, not activated otherwise.

2b: UL subband is activated if indicated as "uplink" in DCI format 2_0, not activated otherwise.

2c: UL subband is activated if indicated as "flexible" in DCI format 2_0, not activated otherwise.

Duplex communications are also described in the following, all of which are incorporated herein by reference in its entirety:

U.S. patent application Ser. No. 17/981,667, filed Nov. 7, 2022, entitled "COMMUNICATIONS NETWORK AND METHODS WITH ENHANCED DUPLEX".

U.S. patent application Ser. No. 17/728,014, filed Apr. 25, 2022, entitled "USER EQUIPMENTS AND METHODS FOR DETERMINING TIME-FREQUENCY RESOURCE SET FOR ENHANCED DUPLEX OPERATION".

U.S. Provisional Patent Application 63/367,463, filed Jun. 30, 2022, entitled "USER EQUIPMENTS AND METHODS FOR DETERMINING TIME-FREQUENCY RESOURCE SET FOR ENHANCED DUPLEX OPERATION".

U.S. Provisional Patent Application 63/367,465, filed Jun. 30, 2022, entitled "USER EQUIPMENTS AND METHODS FOR DETERMINING TIME-FREQUENCY RESOURCE SET FOR ENHANCED DUPLEX OPERATION".

U.S. Provisional Patent Application 63/369,138, filed Jul. 22, 2022, entitled "APPARATUS AND METHODS WITH DOWNLINK CHANNEL RESOURCE MAPPING".

The various foregoing example embodiments and modes may be utilized in conjunction with one another, e.g., in combination with one another.

Figure 18:
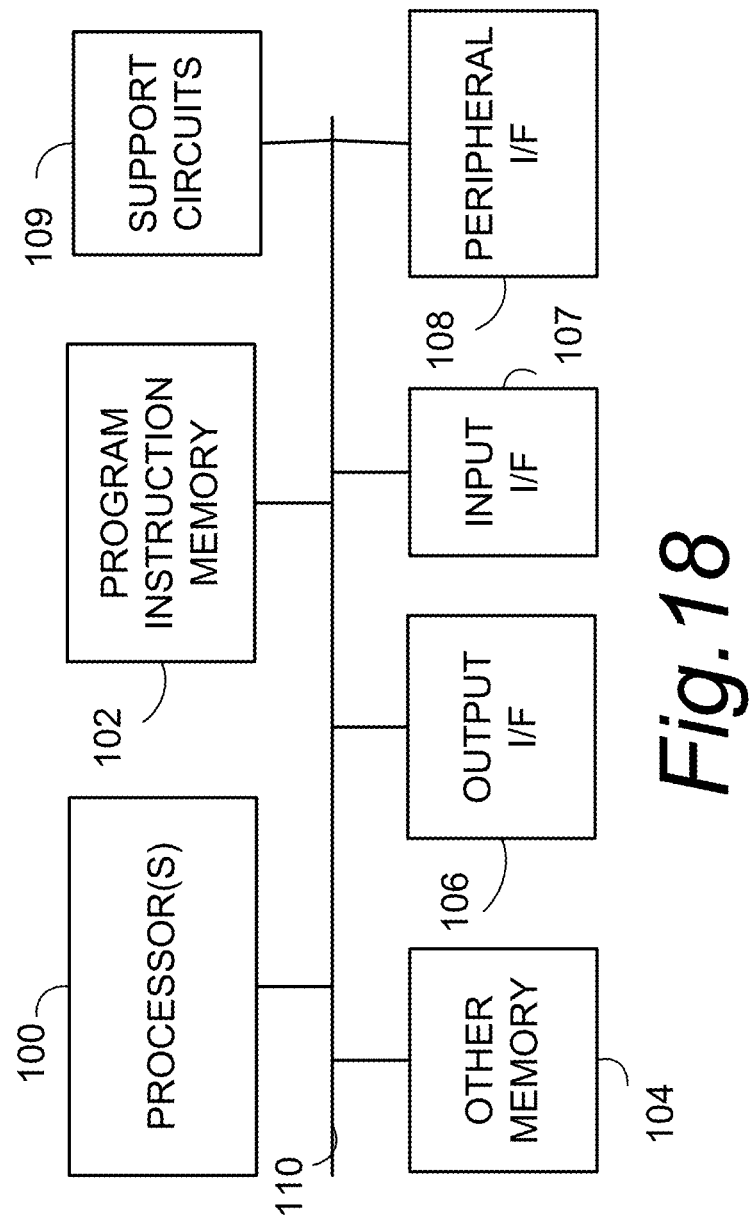
FIG. 18 is a diagrammatic view showing example elements comprising electronic machinery which may comprise a wireless terminal, a radio access node, and a core network node according to an example embodiment and mode.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C Certain units and functionalities described herein may be implemented by electronic machinery. For example, electronic machinery may refer to the processor circuitry described herein, such as terminal processor circuitry 19 and base station processor 39. Moreover, the term "processor circuitry" is not limited to mean one processor, but may include plural processors, with the plural processors operating at one or more sites. Moreover, as used herein the term "server" is not confined to one server unit but may encompass plural servers and/or other electronic equipment and may be co-located at one site or distributed to different sites. With these understandings, FIG. 18 shows an example of electronic machinery, e.g., processor circuitry, as comprising one or more processors 100, program instruction memory 102; other memory 104 (e.g., RAM, cache, etc.); input/output interfaces 106 and 107, peripheral interfaces 108; support circuits 109; and busses 110 for communication between the aforementioned units. The processor(s) 100 may comprise the processor circuitries described herein, for example, terminal processor circuitry 60 and node processor circuitry 34, or any processor(s) of a network entity of the core network and suffixed versions thereof.

A memory or register described herein may be depicted by memory 104, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 109 are coupled to the processors 100 for supporting the processor in a conventional manner. These circuits include cache, power supplies, clock circuits, input/output circuitry and subsystems, and the like.

The term "configured" may relate to the capacity of a device whether the device is in an operational or non-operational state. Configured may also refer to specific settings in a device that effect the operational characteristics of the device whether the device is in an operational or nonoperational state. In other words, the hardware, software, firmware, registers, memory values, and/or the like may be "configured" within a device, whether the device is in an operational or nonoperational state, to provide the device with specific characteristics.

An interface may be a hardware interface, a firmware Interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminals and nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves reception and transmission in a telecommunications system.

Although the description above contains many specificities, these should not be construed as limiting the scope of the technology disclosed herein but as merely providing illustrations of some of the presently preferred embodiments of the technology disclosed herein. Thus, the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A wireless terminal which communicates across a radio interface with a radio access network, the wireless terminal comprising:
   receiver circuitry configured to receive from the radio access network:
      slot format information comprising transmission direction configuration for each symbol in a slot for an uplink (UL) subband;
      validation information;
   processor circuitry configured to use the validation information to perform validation or invalidation of the transmission direction configuration for at least a portion of the UL subband;
   wherein the validation information is obtained from downlink control information comprising slot format information formatted according to a DCI format;
   wherein the DCI format comprises an integer N number of slot format indication (SFI) fields and a cyclic redundancy check (CRC), and wherein the validation information comprises at least one of the following:
      an additional field of the DCI format;
      a radio network temporary identifier (RNTI) used to scramble the CRC;
   wherein the additional field comprises an X-bit field/bitmap, wherein X is an integer greater than 1 and each bit of the X-bit field/bitmap indicates either validation or invalidation of the UL subband; and
   wherein each bit of the X-bit field/bitmap is associated with at least one of the following:
      a slot of the UL subband;
      a group of orthogonal frequency division multiplexed (OFDM) symbols of the UL subband;
      an OFDM symbol of the UL subband.

2. The wireless terminal of claim 1, wherein the validation information is used to perform validation or invalidation of the transmission direction configuration for at least one of the following validation targets:
   all of the UL subband;
   symbols of the uplink subband for which the slot format indicates a downlink direction;
   symbols of the uplink subband for which the slot format indicates an uplink direction;
   symbols of the uplink subband for which the slot format indicates flexible direction.

3. The wireless terminal of claim 1, wherein the receiver circuitry is further configured to receive from the radio access network an indication for which of the validation target the validation information applies.

4. The wireless terminal of claim 1, wherein the DCI format comprises information which specifies which symbols of a slot the UL subband are validated or invalidated.

5. The wireless terminal of claim 1, wherein the format of DCI format comprises information which specifies a symbols of a slot the UL subband as being one of downlink, uplink or flexible.

6. A wireless terminal which communicates across a radio interface with a radio access network, the wireless terminal comprising:
   receiver circuitry configured to receive from the radio access network:
      slot format information comprising transmission direction configuration for each symbol in a slot for an uplink (UL) subband;
      validation information;
   processor circuitry configured to use the validation information to perform validation or invalidation of the transmission direction configuration for at least a portion of the UL subband;
   wherein the validation information is obtained from downlink control information comprising slot format information formatted according to a DCI format; and
   wherein the validation information is obtained from a format type of the slot format information.

7. The wireless terminal of claim 6, wherein the DCI format comprises an integer N number of slot format indication (SFI) fields and a cyclic redundancy check (CRC), and wherein the validation information comprises at least one of the following:
   an additional field of the DCI format;
   a radio network temporary identifier (RNTI) used to scramble the CRC.

8. The wireless terminal of claim 7, wherein the additional field comprises an X-bit field/bitmap, wherein X is an integer greater than 1 and each bit of the X-bit field/bitmap indicates either validation or invalidation of the UL subband.

9. The wireless terminal of claim 8, wherein each bit of the X-bit field/bitmap is associated with one of the following:
   a slot of the UL subband;
   a group of orthogonal frequency division multiplexed (OFDM) symbols of the UL subband;
   an OFDM symbol of the UL subband.

10. The wireless terminal of claim 6, wherein the format type specifies validation or invalidation of at least one of the following:
   all of the UL subband;
   symbols of the uplink subband for which the slot format indicates a downlink direction;
   symbols of the uplink subband for which the slot format indicates an uplink direction;
   symbols of the uplink subband for which the slot format indicates flexible direction.

11. The wireless terminal of claim 6, wherein the format type is DCI format 2_0, and wherein DCI format 2_0 type specifies one of the following:
   the UL subband is validated if indicated as downlink in the DCI format 2_0, not activated otherwise;
   the UL subband is validated if indicated as uplink according to the DCI format 2_0; and
   the UL subband is validated if indicated as flexible according to the DCI format 2_0.

12. The wireless terminal of claim 6, wherein the DCI format comprises information which specifies which symbols of a slot the UL subband are validated or invalidated.

13. The wireless terminal of claim 6, wherein the format of DCI format comprises information which specifies a symbols of a slot the UL subband as being one of downlink, uplink or flexible.

14. An access node of a radio access network which communicates with a wireless terminal over a radio interface, the access node comprising:
   transmitter circuitry configured to transmit to the wireless terminal:
      slot format information comprising transmission direction configuration for each symbol in a slot for an uplink (UL) subband;
      validation information, wherein the validation information is based on a format type of the slot format information;
   receiver circuitry configured to receive from the wireless terminal information transmitted in symbols of the uplink subband according to the validation information.

15. The method node of claim 14, wherein the validation information is provided in downlink control information (DCI) format comprising slot format information.

16. The node terminal of claim 14, wherein the format type specifies validation or invalidation of at least one of the following:
   all of the UL subband;
   symbols of the uplink subband for which the slot format indicates a downlink direction;
   symbols of the uplink subband for which the slot format indicates an uplink direction;
   symbols of the uplink subband for which the slot format indicates flexible direction.

17. The node of claim 14, wherein the format type is DCI format 2_0, and wherein DCI format 2_0 type specifies one of the following:
   the UL subband is validated if indicated as downlink in the DCI format 2_0, not activated otherwise;
   the UL subband is validated if indicated as uplink according to the DCI format 2_0; and
   the UL subband is validated if indicated as flexible according to the DCI format 2_0.

* * * * *